US012578884B2

(12) United States Patent    (10) Patent No.:   US 12,578,884 B2

Berman et al.      (45) Date of Patent:   Mar. 17, 2026

(54) DYNAMIC ONLINE CODE-RATE ALLOCATION ACCORDING TO WORDLINE NOISE FOR ADAPATIVE ECC IN SSD/UFS

(71) Applicant: SAMSUNG ELECTRONICS CO., LTD., Suwon-si (KR)

(72) Inventors: Amit Berman, Binyamina (IL); Tal Philosof, Giv'atayim (IL); Ariel Doubchak, Hertsliya (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/675,684

(22) Filed: May 28, 2024

(65) Prior Publication Data

US 2025/0370638 A1     Dec. 4, 2025

(51) Int. Cl.
    *G06F 3/06*        (2006.01)

(52) U.S. Cl.
    CPC .......... *G06F 3/0631* (2013.01); *G06F 3/0604* (2013.01); *G06F 3/0679* (2013.01)

(58) Field of Classification Search
    CPC .............................. G06F 3/0631; G06F 3/0604
    See application file for complete search history.

(56) References Cited

U.S. PATENT DOCUMENTS

| | | | |
|---|---|---|---|
| 2013/0290618 A1* | 10/2013 | Werner | G06F 11/108 |
| | | | 711/103 |
| 2014/0126288 A1 | 5/2014 | Burger et al. | |
| 2014/0229799 A1 | 8/2014 | Hubris et al. | |
| 2014/0281825 A1* | 9/2014 | Nemazie | G06F 11/1068 |
| | | | 714/773 |
| 2020/0409579 A1* | 12/2020 | Mehta | G06F 3/0659 |
| 2024/0106461 A1* | 3/2024 | Oboukhov | H03M 13/618 |

OTHER PUBLICATIONS

Extended European Search Report dated Oct. 24, 2025, issued by the European Patent Office in European Application No. 25179423.6.

* cited by examiner

*Primary Examiner* — Hosain T Alam
*Assistant Examiner* — Nicholas A. Paperno
(74) *Attorney, Agent, or Firm* — Sughrue Mion, PLLC

(57) ABSTRACT

A storage device, including a non-volatile memory including a plurality of pages; and a storage controller. The storage controller is configured to allocate a plurality of code rates to the plurality of pages, cluster the plurality of pages into a first plurality of pages and a second plurality of pages based on the plurality of code rates, determine a plurality of page associations such that each second page from the second plurality of pages with at least one first page from the first plurality of pages, encode data based on the plurality of code rates to generate encoded data, and store the encoded data in the plurality of pages. The encoding includes obtaining side information corresponding to the second plurality of pages and transferring the side information to the first plurality of pages.

20 Claims, 31 Drawing Sheets

4000

4000

HD read

2SD read

3SD read

1200

1330

1331

Decode good page

1332

Extract information bits corresponding to good page

1333

Extract side information corresponding to good page

1420

1421

Determining coding rate for each page

1422

Associate each bad page with one or more good pages

1423

Encode information bits for bad pages

1424

Compute side information for bad pages

1425

Encode side information

1425

Add encoded side information to information bits for corresponding good pages

1426

Encode information bits and encoded side information for good pages

1430

1431

Decode good page

1432

Extract information bits corresponding to good page

1433

Extract side information corresponding to good page

1510

1511

1512

1513

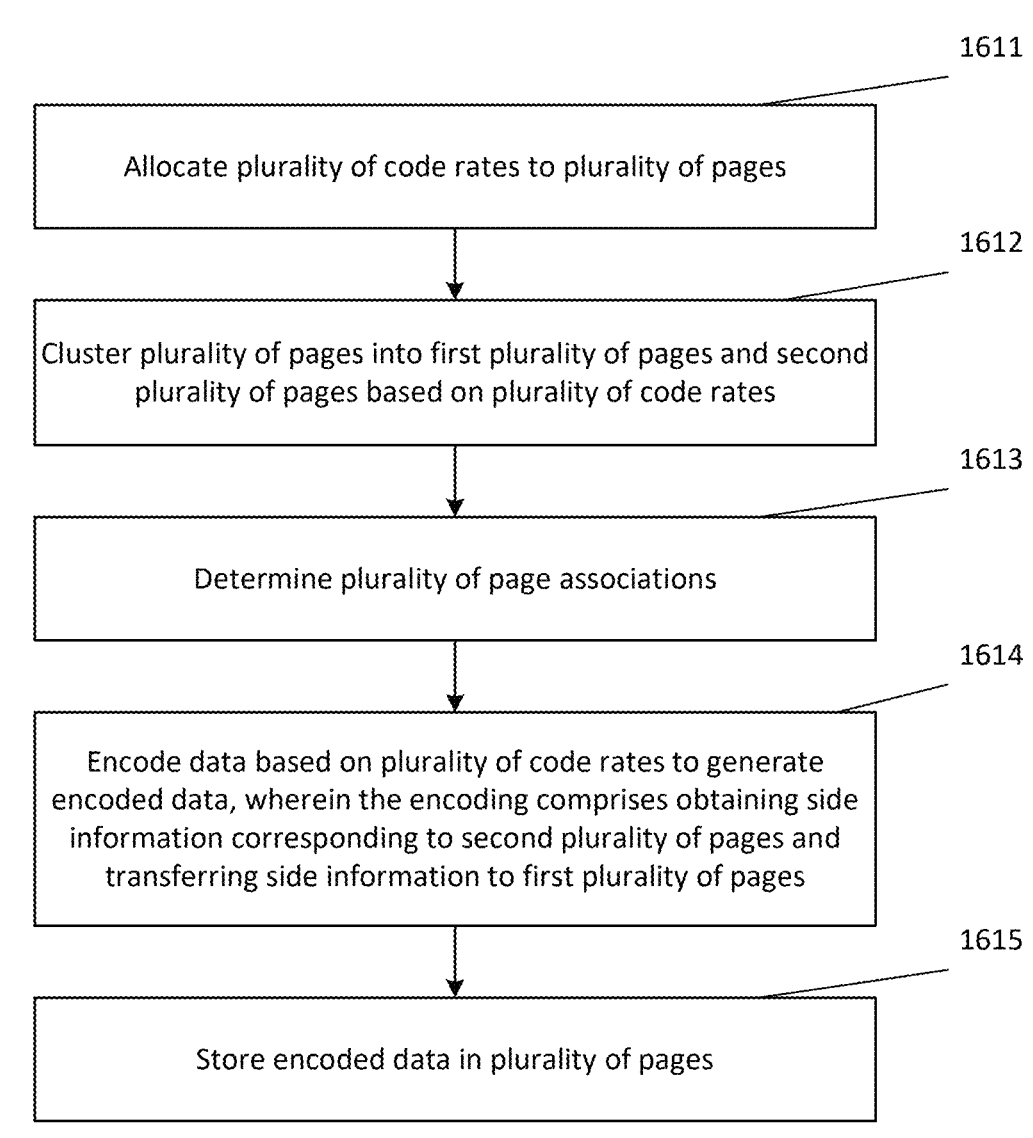

1610

1611

Allocate plurality of code rates to plurality of pages

1612

Cluster plurality of pages into first plurality of pages and second plurality of pages based on plurality of code rates

1613

Determine plurality of page associations

1614

Encode data based on plurality of code rates to generate encoded data, wherein the encoding comprises obtaining side information corresponding to second plurality of pages and transferring side information to first plurality of pages

1615

Store encoded data in plurality of pages

Encode second data to obtain encoded second data
and side information

1622

Append side information to first data
to obtain appended first data

1623

Encode appended first data to obtain encoded first data

1624

Store encoded first data in first plurality of pages and
encoded second data in second plurality of pages

1630

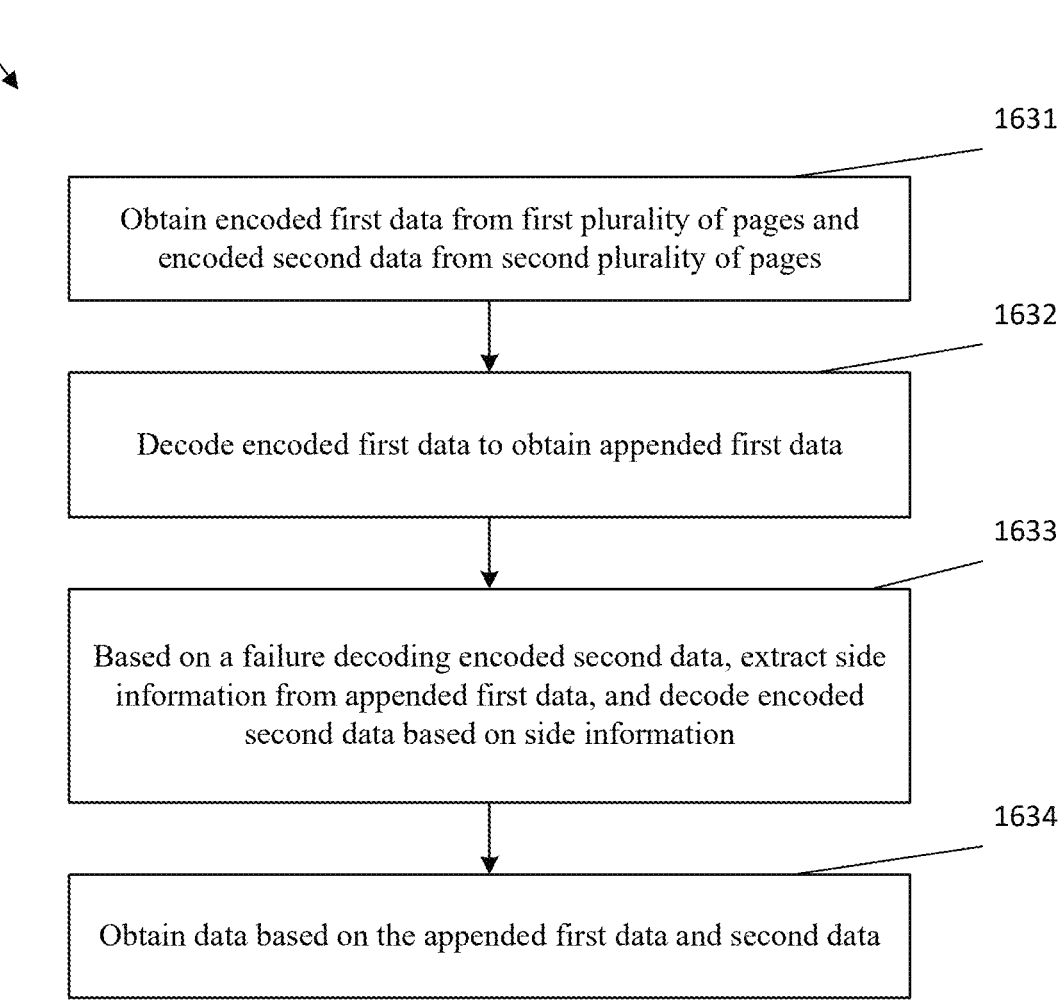

1631

Obtain encoded first data from first plurality of pages and encoded second data from second plurality of pages

1632

Decode encoded first data to obtain appended first data

1633

Based on a failure decoding encoded second data, extract side information from appended first data, and decode encoded second data based on side information

1634

Obtain data based on the appended first data and second data

FIG. 16C

DYNAMIC ONLINE CODE-RATE ALLOCATION ACCORDING TO WORDLINE NOISE FOR ADAPATIVE ECC IN SSD/UFS

BACKGROUND

1. Field

The present disclosure relates to storing data, and more particularly to dynamically distributing code rates and overhead allocations for each page or word line for enhanced reliability.

2. Description of Related Art

Storage devices such as NAND flash memory devices may store data in blocks, and each storage device may contain several blocks. Each block may include many word lines, for example one thousand word lines per block. Each word line may include several pages, which may the basic unit of data that may be accessed in the storage device. Accordingly, such storage devices may include many pages in each block.

Due to manufacturing, design, and use characteristics, there may be a large variability in reliability and error rate between pages included in the same block. Further, as the cell density of storage devices increase, this variability may increase as well. However, in many storage devices, all pages in a block may use the same level of protection.

SUMMARY

Provided are systems, apparatuses, and methods for dynamically allocating a code rate for each page or word line, and redistributing overhead for enhanced reliability.

Additional aspects will be set forth in part in the description which follows and, in part, will be apparent from the description, or may be learned by practice of the presented embodiments.

In accordance with an aspect of the disclosure, a storage device includes: a non-volatile memory including a plurality of pages; and a storage controller: wherein the storage controller is configured to: allocate a plurality of code rates to the plurality of pages, cluster the plurality of pages into a first plurality of pages and a second plurality of pages based on the plurality of code rates, determine a plurality of page associations such that each second page from the second plurality of pages with at least one first page from the first plurality of pages, encode data based on the plurality of code rates to generate encoded data, wherein the encoding includes obtaining side information corresponding to the second plurality of pages and transferring the side information to the first plurality of pages, and store the encoded data in the plurality of pages.

In accordance with an aspect of the disclosure, a storage controller for controlling a storage device includes: at least one processor configured to: obtain page characteristic information corresponding to a plurality of pages, sort the plurality of pages into a first plurality of pages and a second plurality of pages based on the page characteristic information, determine a plurality of page associations such that each second page of the second plurality of pages is associated with at least one first page of the first plurality of pages, encode data to generate encoded data, transfer a plurality of additional overhead bits from the second plurality of pages to the first plurality of pages based on the plurality of page associations, and store the encoded data in the plurality of pages.

In accordance with an aspect of the disclosure, a method of controlling a storage device is executed by at least one processor includes: allocating a plurality of code rates to a plurality of pages included in a non-volatile memory; clustering the plurality of pages into a first plurality of pages and a second plurality of pages based on the plurality of code rates; determining a plurality of page associations such that each second page from the second plurality of pages with at least one first page from the first plurality of pages; encoding data based on the plurality of code rates to generate encoded data, wherein the encoding includes obtaining side information corresponding to the second plurality of pages and transferring the side information to the first plurality of pages, and storing the encoded data in the plurality of pages.

In accordance with an aspect of the disclosure, a method of controlling a storage device is executed by at least one processor includes: obtaining page characteristic information corresponding to a plurality of pages; sorting the plurality of pages into a first plurality of pages and a second plurality of pages based on the page characteristic information; determining a plurality of page associations such that each second page of the second plurality of pages is associated with at least one first page of the first plurality of pages, encoding data to generate encoded data; transferring a plurality of additional overhead bits from the second plurality of pages to the first plurality of pages based on the plurality of page associations; and storing the encoded data in the plurality of pages.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 16A-16C are flowcharts of processes for controlling a storage system, according to embodiments.

DETAILED DESCRIPTION

At least some embodiments of the current disclosure provide a protection scheme capable of providing different levels of protection among various pages included in a single block by dynamically distributing code rates and overhead allocations among the various pages.

Figure 1:
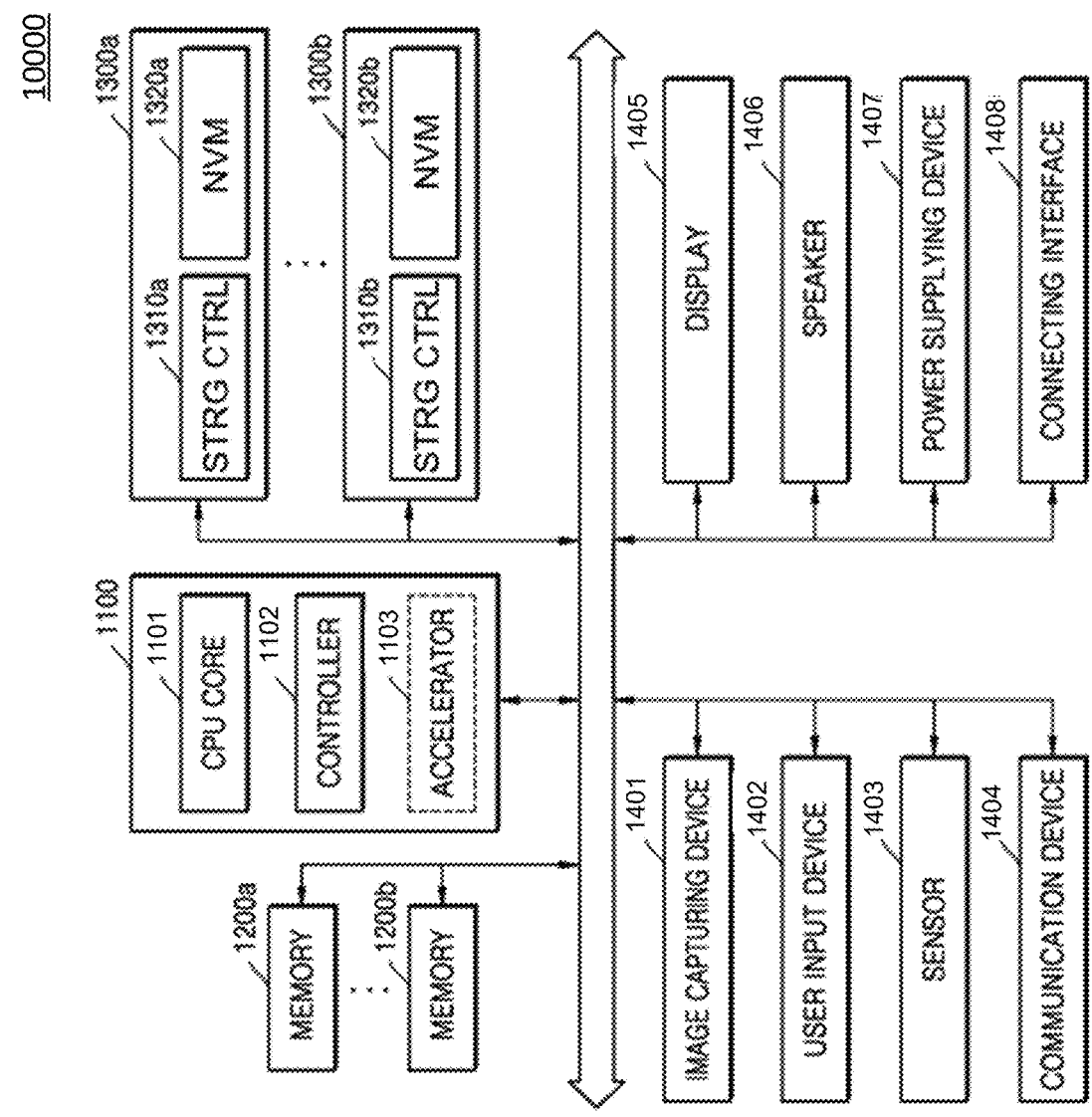
FIG. 1 is a block diagram of a computer system, according to embodiments.

FIG. 1 is a diagram of a system 10000 to which embodiments may be applied. The system 10000 of FIG. 1 may be, for example, a mobile system, such as a portable communication terminal (e.g., a mobile phone), a smartphone, a tablet personal computer (PC), a wearable device, a healthcare device, or an Internet of things (IoT) device. However, the system 10000 of FIG. 1 is not necessarily limited to the mobile system and may be a PC, a laptop computer, a server, a media player, or an automotive device (e.g., a navigation device).

Referring to FIG. 1, the system 10000 may include a main processor 1100, memories (e.g., 1200a and 1200b), and storage devices (e.g., 1300a and 1300b). In addition, the system 10000 may include at least one of an image capturing device 1401, a user input device 1402, a sensor 1403, a communication device 1404, a display 1405, a speaker 1406, a power supplying device 1407, and a connecting interface 1408.

The main processor 1100 may control all operations of the system 10000, more specifically, operations of other components included in the system 10000. The main processor 1100 may be implemented as a general-purpose processor, a dedicated processor, or an application processor.

The main processor 1100 may include at least one CPU core 1101 and further include a controller 1102 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 10000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, embodiments are not limited thereto, and the NVMs 1320a and 1320b may include other types of NVMs, such as PRAM and/or RRAM.

The storage devices 1300a and 1300b may be physically separated from the main processor 1100 and included in the system 10000 or implemented in the same package as the main processor 1100. In addition, the storage devices 1300a and 1300b may have types of SSDs or memory cards, and may be removably combined with other components of the system 10000 through an interface, such as the connecting interface 1408 described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1401 may capture still images or moving images. The image capturing device 1401 may include a camera, a camcorder, and/or a webcam.

The user input device 1402 may receive various types of data input by a user of the system 10000 and include a touch pad, a keypad, a keyboard, a mouse, and/or a microphone.

The sensor 1403 may detect various types of physical quantities, which may be obtained from the outside of the system 10000, and convert the detected physical quantities into electric signals. The sensor 1403 may include a temperature sensor, a pressure sensor, an illuminance sensor, a position sensor, an acceleration sensor, a biosensor, and/or a gyroscope sensor.

The communication device 1404 may transmit and receive signals between other devices outside the system 10000 according to various communication protocols. The communication device 1404 may include an antenna, a transceiver, and/or a modem.

The display 1405 and the speaker 1406 may serve as output devices configured to respectively output visual information and auditory information to the user of the system 10000.

The power supplying device 1407 may appropriately convert power supplied from a battery embedded in the system 10000 and/or an external power source, and supply the converted power to each of components of the system 10000.

The connecting interface 1408 may provide connection between the system 10000 and an external device, which is connected to the system 10000 and capable of transmitting and receiving data to and from the system 10000. The connecting interface 1408 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
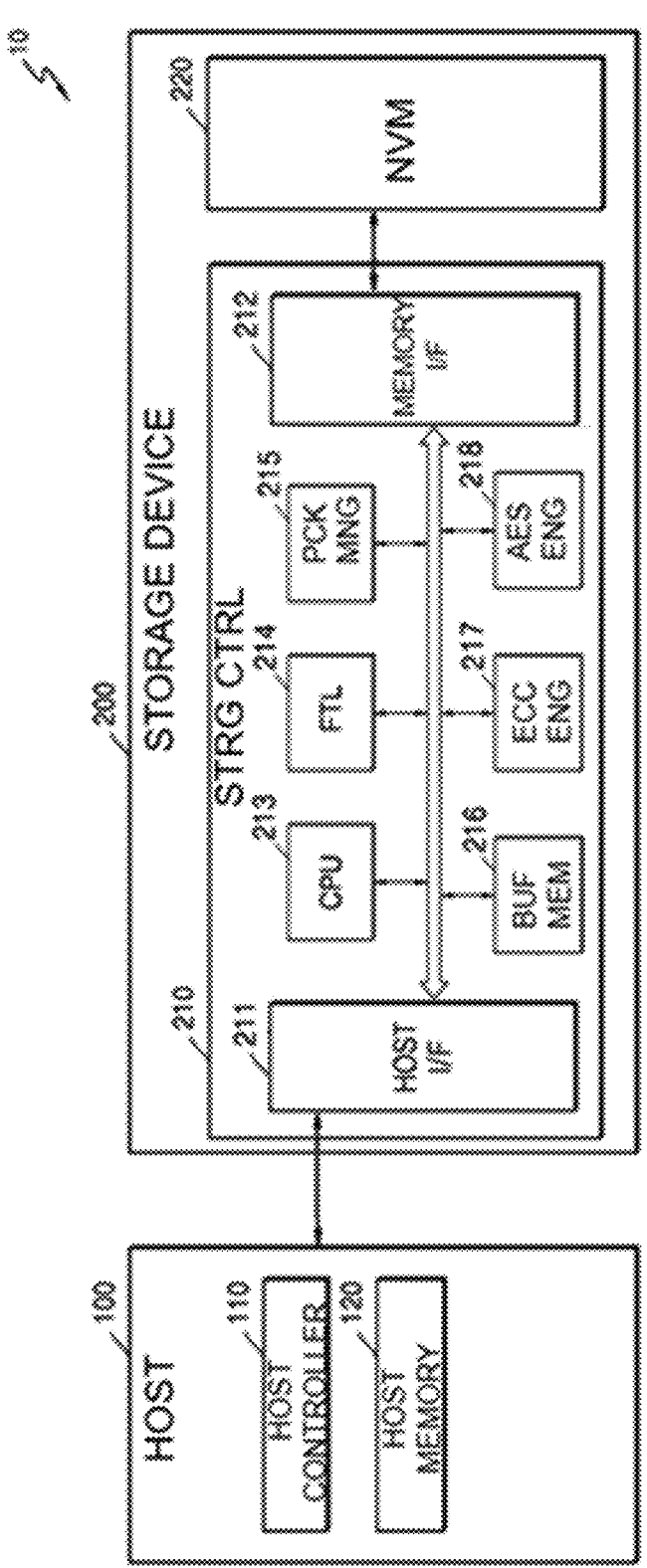
FIG. 2 is a block diagram of a host storage system, according to embodiments.

FIG. 2 is a block diagram of a host storage system 10 according to an example embodiment.

The host storage system 10 may include a host 100 and a storage device 200. Further, the storage device 200 may include a storage controller 210, and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controller 210 may further include a flash translation layer (FTL) 214, a packet manager 215, a buffer memory 216, an error correction code (ECC) engine 217, and an advanced encryption standard (AES) engine 218. The storage controller 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controller 210, the buffer memory 216 may be outside the storage controller 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controller 210 by using a symmetric-key algorithm.

Figure 3:
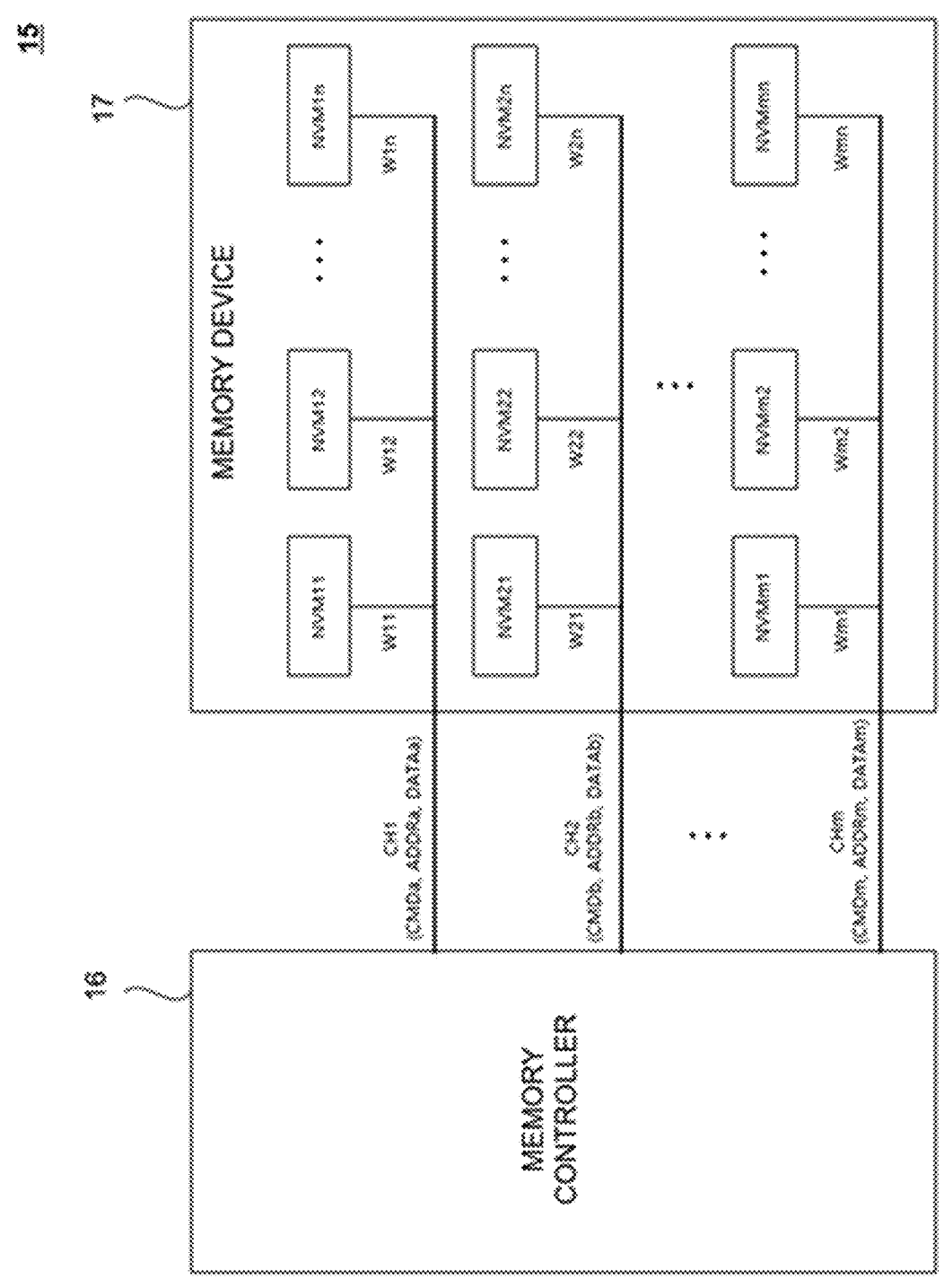
FIG. 3 is a block diagram of a memory system, according to embodiments.

FIG. 3 is a block diagram of a memory system 15 according embodiments. Referring to FIG. 3, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the embodiments of the disclosure are not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, memory controller 16 may select the NVM device NVM11 from the NVM devices NVM11 to NVM1n connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM11 to NVM1n.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 3 illustrates an example in which the memory device 17 communicates with the memory controller 16 through m channels and includes n NVM devices corresponding to each of the channels, the number of channels and the number of NVM devices connected to one channel may be variously changed.

Figure 4:
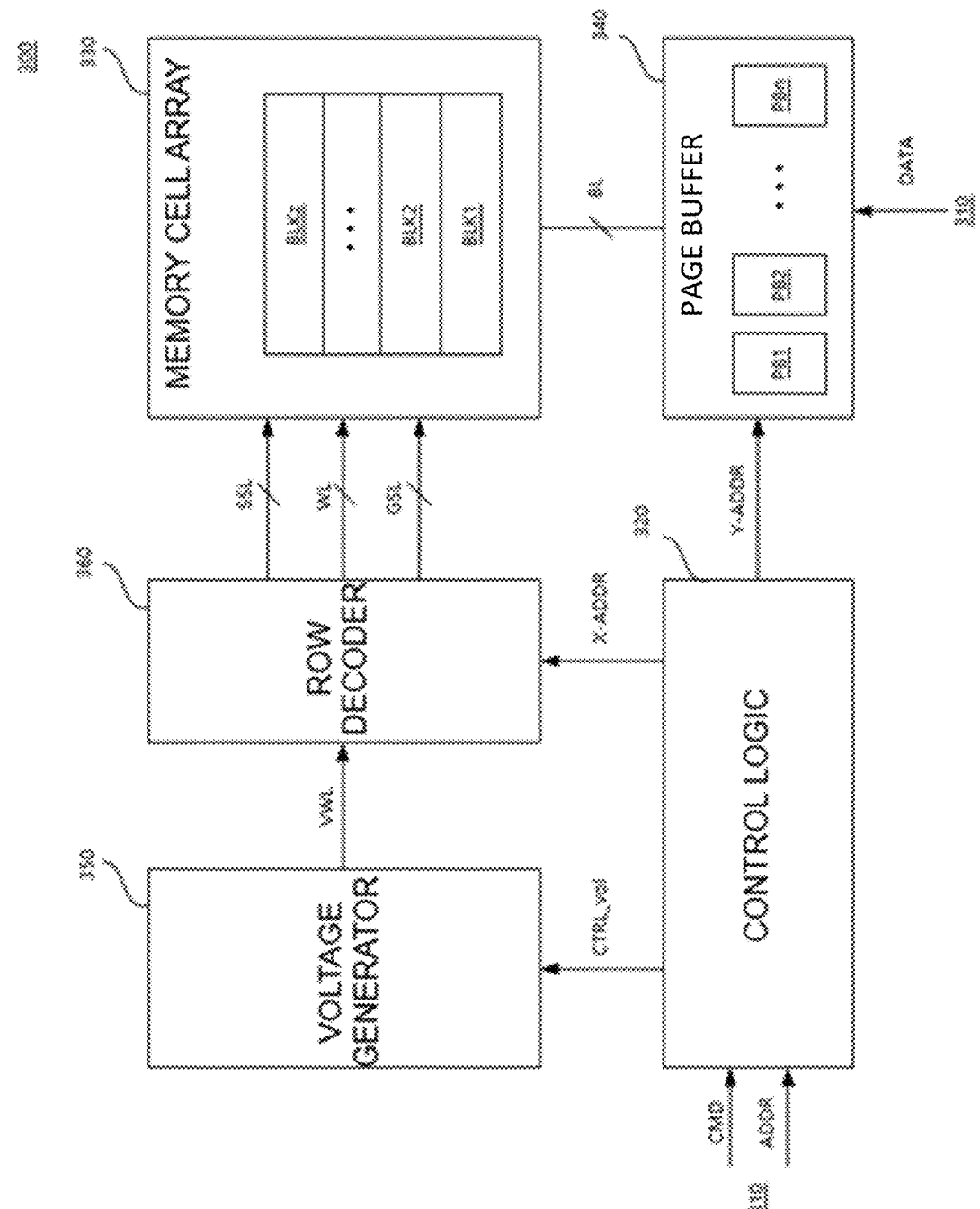
FIG. 4 is a block diagram of a memory device, according to embodiments.

FIG. 4 is a block diagram of a memory device 300 according to an example embodiment. Referring to FIG. 4, the memory device 300 may include a control logic circuitry 320, a memory cell array 330, a page buffer 340, a voltage generator 350, and a row decoder 360. The memory device 300 may further include a memory interface circuitry 310 shown in FIG. 6. In addition, the memory device 300 may further include a column logic, a pre-decoder, a temperature sensor, a command decoder, and/or an address decoder.

The control logic circuitry 320 may control all various operations of the memory device 300. The control logic circuitry 320 may output various control signals in response to commands CMD and/or addresses ADDR from the memory interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer 340 through bit lines BL and be connected to the row decoder 360 through word lines WL, string selection lines SSL, and ground selection lines GSL.

In an example embodiment, the memory cell array 330 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In an example embodiment, the memory cell array 330 may include a 2D memory cell array, which includes a plurality of NAND strings arranged in a row direction and a column direction.

The page buffer 340 may include a plurality of page buffers PB1 to PBn (here, n is an integer greater than or equal to 3), which may be respectively connected to the memory cells through a plurality of bit lines BL. The page buffer 340 may select at least one of the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed, to the selected bit line. During a read operation, the page buffer 340 may sense current or a voltage of the selected bit line BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a word line voltage VWL.

The row decoder 360 may select one of a plurality of word lines WL and select one of a plurality of string selection lines SSL in response to the row address X-ADDR. For example, the row decoder 360 may apply the program voltage and the program verification voltage to the selected word line WL during a program operation and apply the read voltage to the selected word line WL during a read operation.

Figure 5:
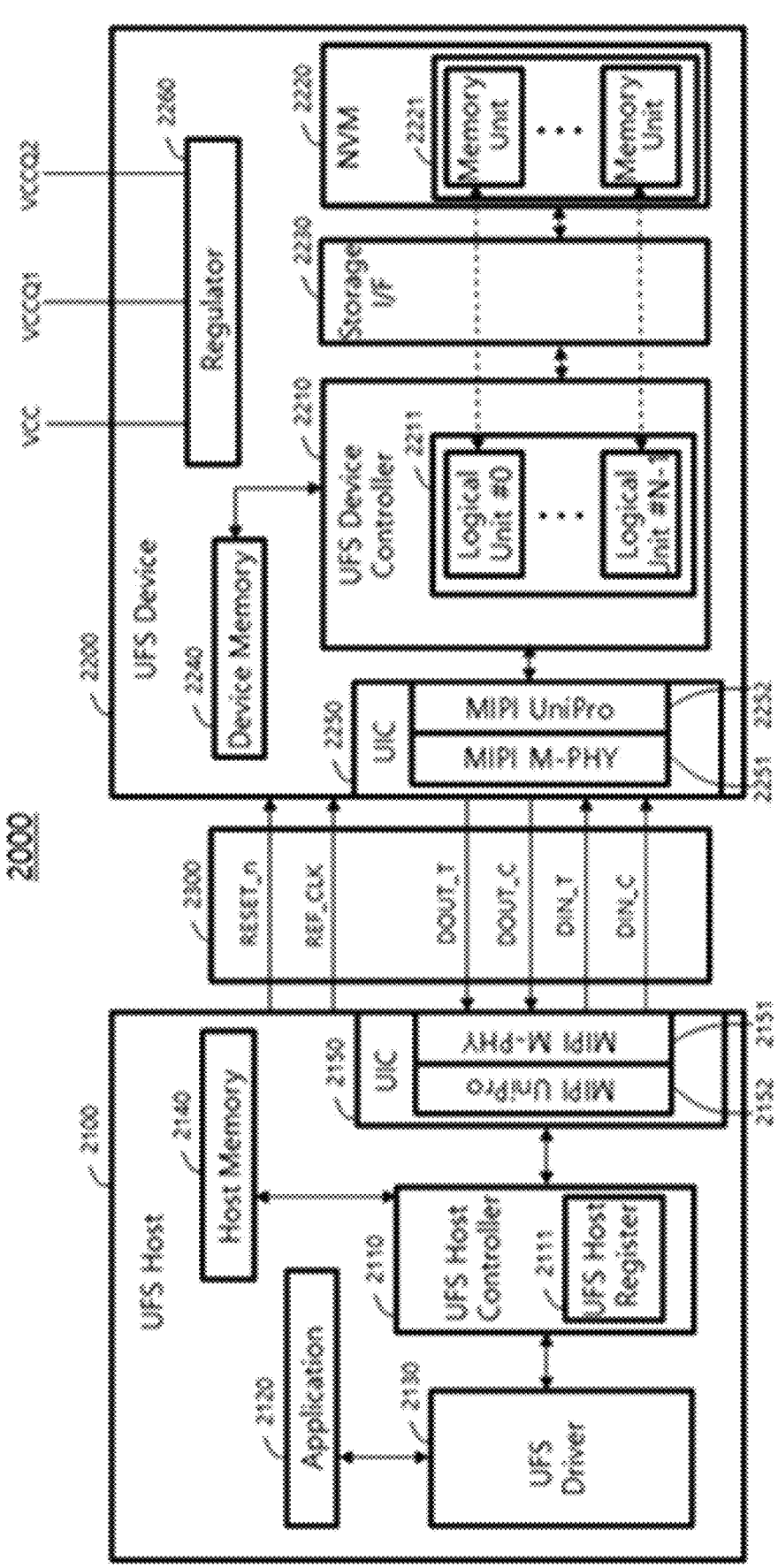
FIG. 5 is a block diagram of a UFS system, according to embodiments.

FIG. 5 is a diagram of a UFS system 2000 according to embodiments. The UFS system 2000 may be a system conforming to a UFS standard announced by Joint Electron Device Engineering Council (JEDEC) and include a UFS host 2100, a UFS device 2200, and a UFS interface 2300. The above description of the system 10000 of FIG. 1 may also be applied to the UFS system 2000 of FIG. 5 within a range that does not conflict with the following description of FIG. 5.

Referring to FIG. 5, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1102 of the main processor 1100 and the memories 1200a and 1200b of FIG. 1. The UFS device 2200 may correspond to the storage device 1300a and 1300b of FIG. 1, and a UFS device controller 2210 and an NVM 2220 may respectively correspond to the storage controllers 1310a and 1310b and the NVMs 1320a and 1320b of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 5, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 5, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPIM-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

As discussed above, embodiments may relate to efficient BCH decoding with low error correcting capability, which may correct t and (t+1) errors in polar codewords. As discussed above, an error correcting capability of t=2 may be used, however embodiments are not limited thereto. In embodiments, at least some polar codewords from among a plurality of polar codewords, which may be stored for example in a storage device, may be decoded using BCH decoders and not polar decoders, and therefore an overall throughput may be increased. In some embodiments, one or more polar parity may be used for checking or validating the polar frames, and for performing smart chase decoding, examples of which are discussed in greater detail below.

Figure 6A:
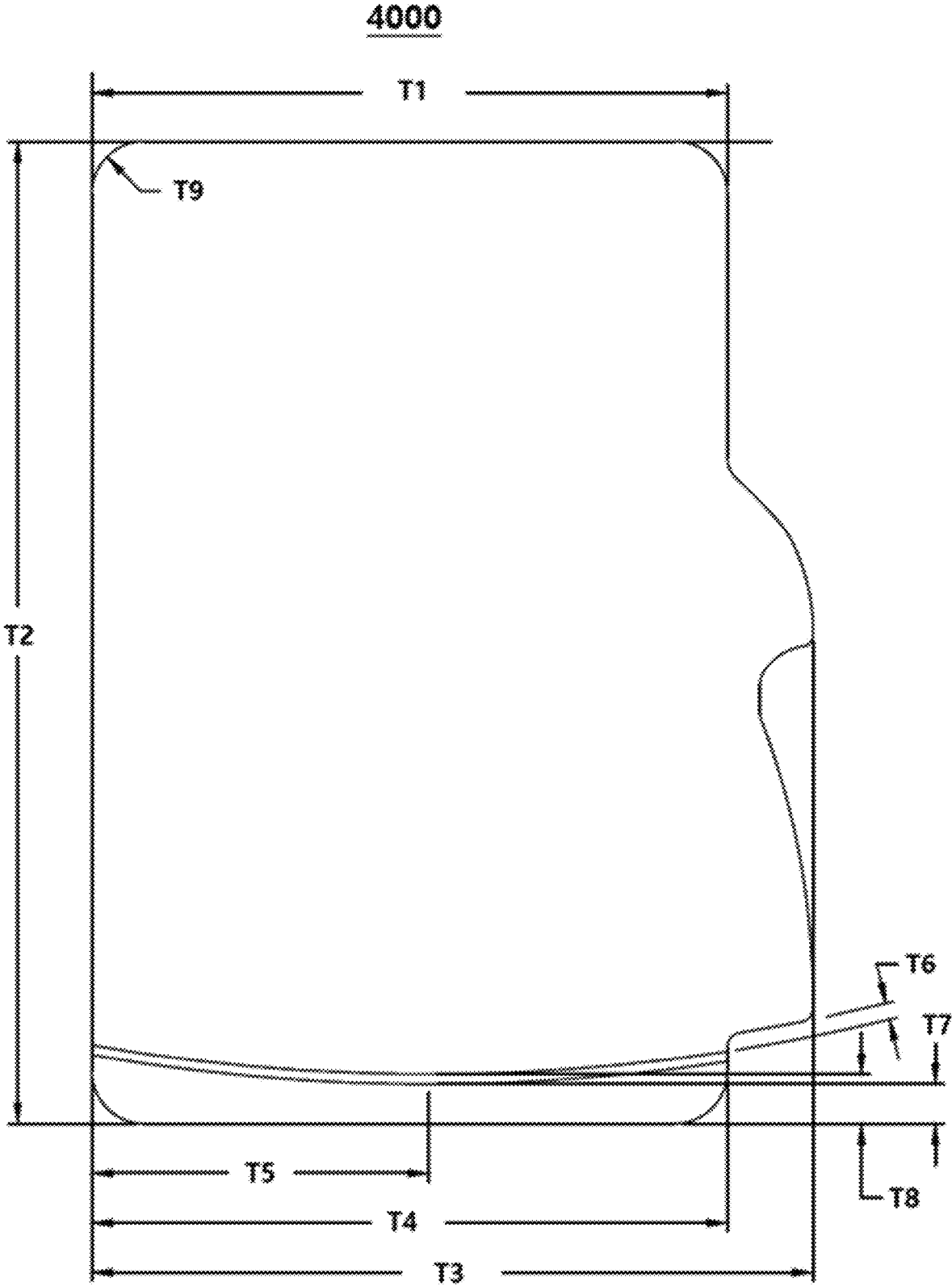
FIGS. 6A to 6C are diagrams of a form factor of a UFS card, according to embodiments.
Figure 6B:
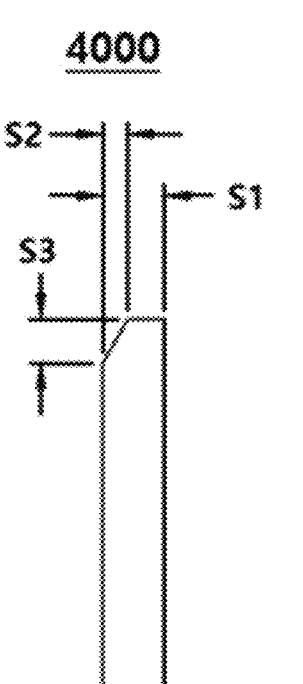
Figure 6C:
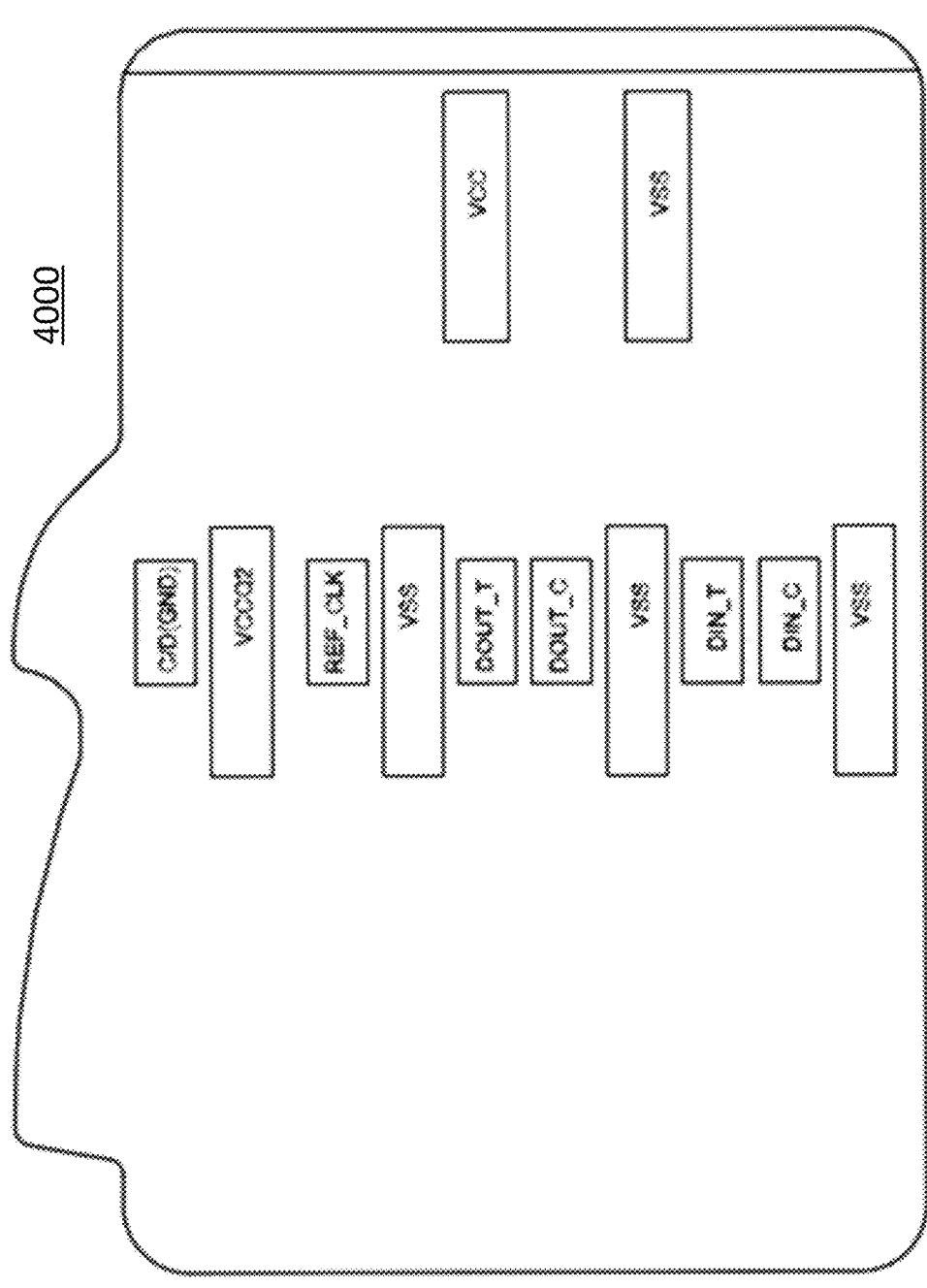

FIGS. 6A to 6C are diagrams of a form factor of a UFS card 4000. When the UFS device 2200 described with reference to FIG. 5 is implemented as the UFS card 4000, an outer appearance of the UFS card 4000 may be as shown in FIGS. 6A to 6C.

FIG. 6A is a top view of the UFS card 4000, according to an example embodiment. Referring to FIG. 6A, it can be seen that the UFS card 4000 entirely follows a shark-shaped design. In FIG. 6A, the UFS card 4000 may have dimensions shown in Table 1 below as an example.

TABLE 1

| Item | Dimension (mm) |
|------|----------------|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 6B is a side view of the UFS card 4000, according to an example embodiment. In FIG. 6B, the UFS card 4000 may have dimensions shown in Table 2 below as an example.

TABLE 2

| Item | Dimension (mm) |
|------|----------------|
| S1 | 0.74 ± 0.06 |
| S2 | 0.30 |
| S3 | 0.52 |
| S4 | 1.20 |
| S5 | 1.05 |
| S6 | 1.00 |

FIG. 6C is a bottom view of the UFS card 4000, according to an example embodiment. Referring to FIG. 6C, a plurality of pins for electrical contact with a UFS slot may be formed on a bottom surface of the UFS card 4000. Functions of each of the pins will be described below. Based on symmetry between a top surface and the bottom surface of the UFS card 4000, some pieces (e.g., T1 to T5 and T9) of information about the dimensions described with reference to FIG.

6A and Table 1 may also be applied to the bottom view of the UFS card 4000, which is shown in FIG. 6C.

A plurality of pins for an electrical connection with a UFS host may be formed on the bottom surface of the UFS card 4000. Referring to FIG. 6C, a total number of pins may be 12. Each of the pins may have a rectangular shape, and signal names corresponding to the pins may be as shown in FIG. 6C. Specific information about each of the pins will be understood with reference to Table 3 below and the above description presented with reference to FIG. 5.

TABLE 3

| No. | Signal Name | Description | Dimension (mm) |
|---|---|---|---|
| 1 | Vss | Ground (GND) | 3.00 × 0.72 ± 0.05 |
| 2 | DIN_C | Differential input signals input | 1.50 × 0.72 ± 0.05 |
| 3 | DIN_T | from a host to the UFS card 4000 (DIN_C is a negative node, and DIN_T is a positive node) | |
| 4 | Vss | Ground (GND) | 3.00 × 0.72 ± 0.05 |
| 5 | DOUT_C | Differential output signals | 1.50 × 0.72 ± 0.05 |
| 6 | DOUT_T | output from the UFS card 4000 to the host (DOUT_C is a negative node, and DOUT_T is a positive node) | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 7:
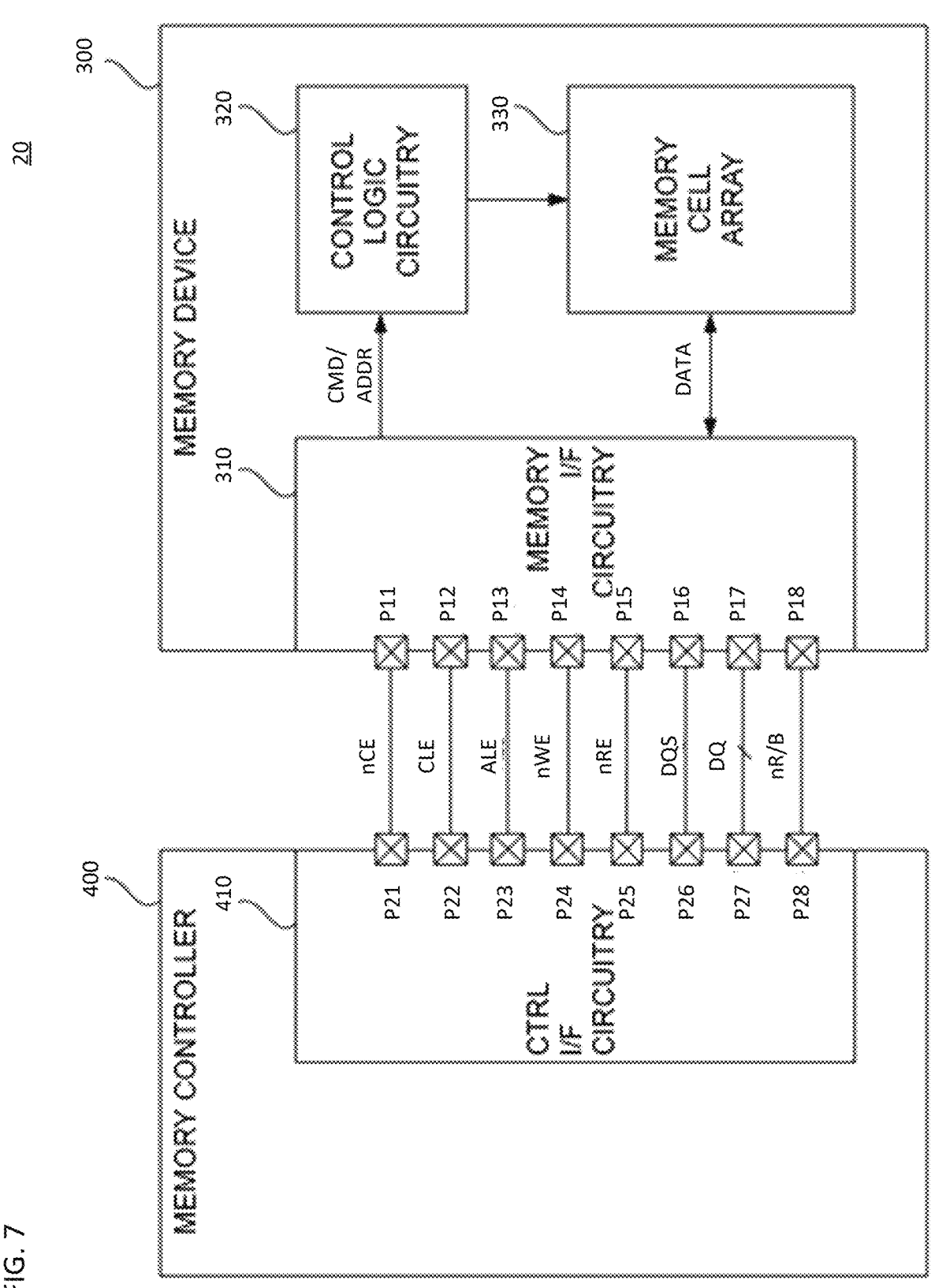
FIG. 7 is a block diagram of a memory system according to embodiments.

FIG. 7 is a block diagram of a memory system 20 according to an embodiment. Referring to FIG. 7, the memory system 20 may include a memory device 300 and a memory controller 400. The memory device 300 may correspond to one of NVM devices NVM11 to NVMmn, which communicate with a memory controller 400 based on one of the plurality of channels CH1 to CHm of FIG. 3. The memory controller 400 may correspond to the storage controller 210 of FIG. 3.

The memory device 300 may include first to eighth pins P11 to P18, a memory interface circuitry 310, a control logic circuitry 320, and a memory cell array 330.

The memory interface circuitry 310 may receive a chip enable signal nCE from the memory controller 400 through the first pin P11. The memory interface circuitry 310 may transmit and receive signals to and from the memory controller 400 through the second to eighth pins P12 to P18 in response to the chip enable signal nCE. For example, when the chip enable signal nCE is in an enable state (e.g., a low level), the memory interface circuitry 310 may transmit and receive signals to and from the memory controller 400 through the second to eighth pins P12 to P18.

The memory interface circuitry 310 may receive a command latch enable signal CLE, an address latch enable signal ALE, and a write enable signal nWE from the memory controller 400 through the second to fourth pins P12 to P14. The memory interface circuitry 310 may receive a data signal DQ from the memory controller 400 through the seventh pin P17 or transmit the data signal DQ to the memory controller 400. A command CMD, an address ADDR, and data may be transmitted via the data signal DQ.

For example, the data signal DQ may be transmitted through a plurality of data signal lines. In this case, the seventh pin P17 may include a plurality of pins respectively corresponding to a plurality of data signals DQ(s).

The memory interface circuitry 310 may obtain the command CMD from the data signal DQ, which is received in an enable section (e.g., a high-level state) of the command latch enable signal CLE based on toggle time points of the write enable signal nWE. The memory interface circuitry 310 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 310 may obtain the command CMD or the address ADDR based on toggle time points of the write enable signal nWE.

The memory interface circuitry 310 may receive a read enable signal nRE from the memory controller 400 through the fifth pin P15. The memory interface circuitry 310 may receive a data strobe signal DQS from the memory controller 400 through the sixth pin P16 or transmit the data strobe signal DQS to the memory controller 400.

In a data (DATA) output operation of the memory device 300, the memory interface circuitry 310 may receive the read enable signal nRE, which toggles through the fifth pin P15, before outputting the data DATA. The memory interface circuitry 310 may generate the data strobe signal DQS, which toggles based on the toggling of the read enable signal nRE. For example, the memory interface circuitry 310 may generate a data strobe signal DQS, which starts toggling after a predetermined delay (e.g., tDQSRE), based on a toggling start time of the read enable signal nRE. The memory interface circuitry 310 may transmit the data signal DQ including the data DATA based on a toggle time point of the data strobe signal DQS. Thus, the data DATA may be aligned with the toggle time point of the data strobe signal DQS and transmitted to the memory controller 400.

In a data (DATA) input operation of the memory device 300, when the data signal DQ including the data DATA is received from the memory controller 400, the memory interface circuitry 310 may receive the data strobe signal DQS, which toggles, along with the data DATA from the memory controller 400. The memory interface circuitry 310 may obtain the data DATA from the data signal DQ based on toggle time points of the data strobe signal DQS. For example, the memory interface circuitry 310 may sample the data signal DQ at rising and falling edges of the data strobe signal DQS and obtain the data DATA.

The memory interface circuitry 310 may transmit a ready/busy output signal nR/B to the memory controller 400 through the eighth pin P18. The memory interface circuitry 310 may transmit state information of the memory device 300 through the ready/busy output signal nR/B to the memory controller 400. When the memory device 300 is in a busy state (i.e., when operations are being performed in the memory device 300), the memory interface circuitry 310 may transmit a ready/busy output signal nR/B indicating the busy state to the memory controller 400. When the memory device 300 is in a ready state (i.e., when operations are not performed or completed in the memory device 300), the memory interface circuitry 310 may transmit a ready/busy output signal nR/B indicating the ready state to the memory controller 400. For example, while the memory device 300 is reading data DATA from the memory cell array 330 in response to a page read command, the memory interface circuitry 310 may transmit a ready/busy output signal nR/B indicating a busy state (e.g., a low level) to the memory controller 400. For example, while the memory device 300 is programming data DATA to the memory cell array 330 in response to a program command, the memory interface circuitry 310 may transmit a ready/busy output signal nR/B indicating the busy state to the memory controller 400.

The control logic circuitry 320 may control all operations of the memory device 300. The control logic circuitry 320 may receive the command/address CMD/ADDR obtained from the memory interface circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface circuitry 310, via the control of the control logic circuitry 320. The memory cell array 330 may output the stored data DATA to the memory interface circuitry 310 via the control of the control logic circuitry 320.

The memory cell array 330 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 400 may include first to eighth pins P21 to P28 and a controller interface circuitry 410. The first to eighth pins P21 to P28 may respectively correspond to the first to eighth pins P11 to P18 of the memory device 300.

The controller interface circuitry 410 may transmit a chip enable signal nCE to the memory device 300 through the first pin P21. The controller interface circuitry 410 may transmit and receive signals to and from the memory device 300, which is selected by the chip enable signal nCE, through the second to eighth pins P22 to P28.

The controller interface circuitry 410 may transmit the command latch enable signal CLE, the address latch enable signal ALE, and the write enable signal nWE to the memory device 300 through the second to fourth pins P22 to P24. The controller interface circuitry 410 may transmit or receive the data signal DQ to and from the memory device 300 through the seventh pin P27.

The controller interface circuitry 410 may transmit the data signal DQ including the command CMD or the address ADDR to the memory device 300 along with the write enable signal nWE, which toggles. The controller interface circuitry 410 may transmit the data signal DQ including the command CMD to the memory device 300 by transmitting a command latch enable signal CLE having an enable state. Also, the controller interface circuitry 410 may transmit the data signal DQ including the address ADDR to the memory device 300 by transmitting an address latch enable signal ALE having an enable state.

The controller interface circuitry 410 may transmit the read enable signal nRE to the memory device 300 through the fifth pin P25. The controller interface circuitry 410 may receive or transmit the data strobe signal DQS from or to the memory device 300 through the sixth pin P26.

In a data (DATA) output operation of the memory device 300, the controller interface circuitry 410 may generate a read enable signal nRE, which toggles, and transmit the read enable signal nRE to the memory device 300. For example, before outputting data DATA, the controller interface circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface circuitry 410 may receive the data signal DQ including the data DATA along with the data strobe signal DQS, which toggles, from the memory device 300. The controller interface circuitry 410 may obtain the data DATA from the data signal DQ based on a toggle time point of the data strobe signal DQS.

In a data (DATA) input operation of the memory device 300, the controller interface circuitry 410 may generate a data strobe signal DQS, which toggles. For example, before transmitting data DATA, the controller interface circuitry 410 may generate a data strobe signal DQS, which is changed from a static state (e.g., a high level or a low level) to a toggling state. The controller interface circuitry 410 may transmit the data signal DQ including the data DATA to the memory device 300 based on toggle time points of the data strobe signal DQS.

The controller interface circuitry 410 may receive a ready/busy output signal nR/B from the memory device 300 through the eighth pin P28. The controller interface circuitry 410 may determine state information of the memory device 300 based on the ready/busy output signal nR/B.

Figure 8:
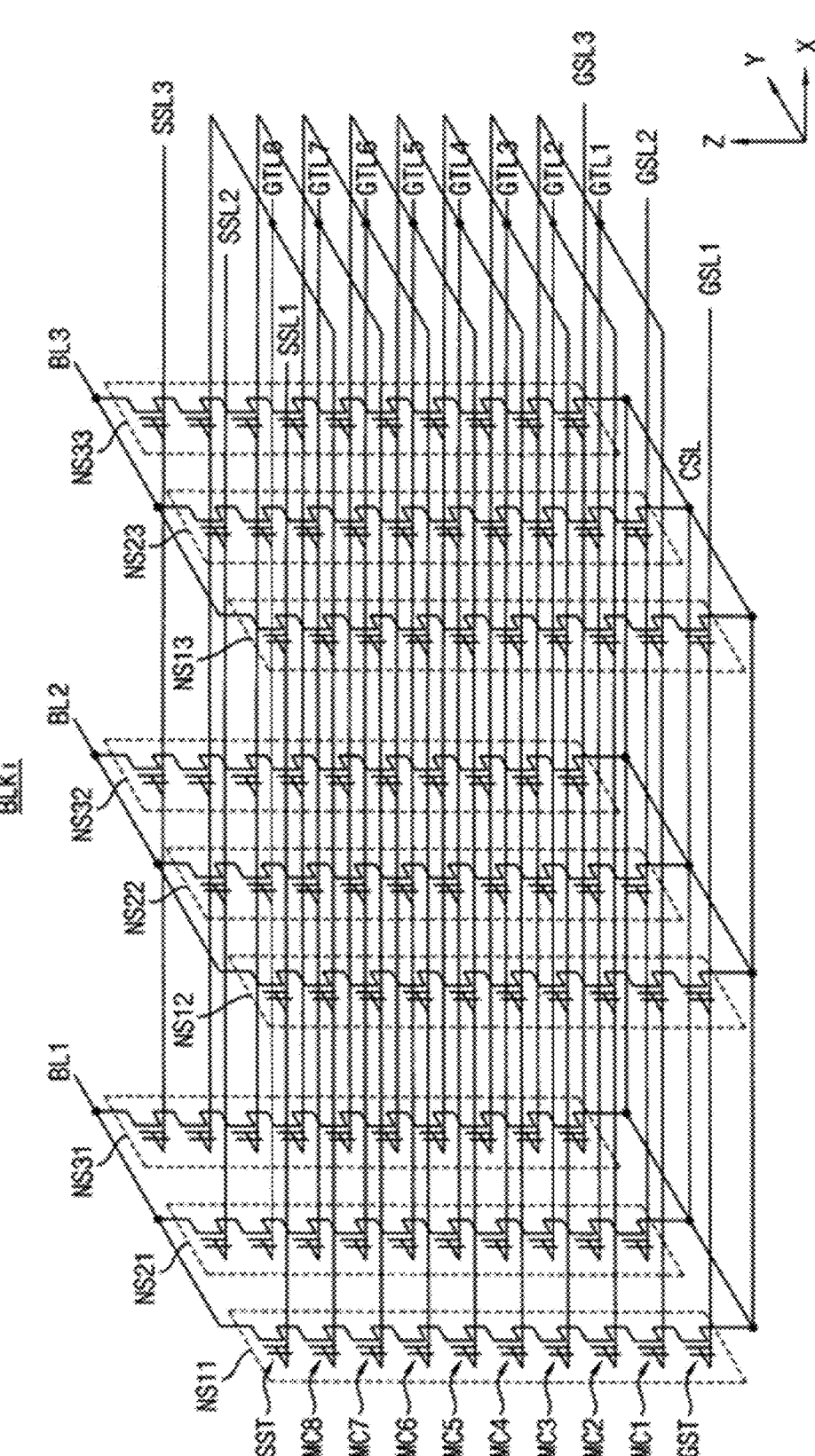
FIG. 8 is a diagram of a 3D V-NAND structure applicable to a UFS device according to embodiments.

FIG. 8 is a diagram of a 3D V-NAND structure applicable to a UFS device according to an embodiment. When a storage module of the UFS device is implemented as a 3D V-NAND flash memory, each of a plurality of memory blocks included in the storage module may be represented by an equivalent circuit shown in FIG. 8.

A memory block BLKi shown in FIG. 8 may refer to a 3D memory block having a 3D structure formed on a substrate. For example, a plurality of memory NAND strings included in the memory block BLKi may be formed in a vertical direction to the substrate. In embodiments, the vertical direction may correspond to a Z-axis direction illustrated in FIG. 8. In embodiments, the vertical direction may be referred to as a pillar direction.

Referring to FIG. 8, the memory block BLKi may include a plurality of memory NAND strings (e.g., NS11 to NS33), which are connected between bit lines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 8, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to word lines, and some of the gate lines GTL1, GTL2, . . . , and GTL8 may correspond to dummy word lines. The ground selection transistor GST may be connected to ground selection lines GSL1, GSL2, and GSL3 corresponding thereto.

The string selection transistor SST may be connected to the bit lines BL1, BL2, and BL3 corresponding thereto, and the ground selection transistor GST may be connected to the common source line CSL.

Word lines (e.g., WL1) at the same level (e.g., the same row) may be connected in common, and the ground selection lines GSL1, GSL2, and GSL3 and the string selection lines SSL1, SSL2, and SSL3 may be separated from each other. FIG. 8 illustrates a case in which a memory block BLK is connected to eight gate lines GTL1, GTL2, . . . , and GTL8 and three bit lines BL1, BL2, and BL3, without being limited thereto.

Figure 9A:
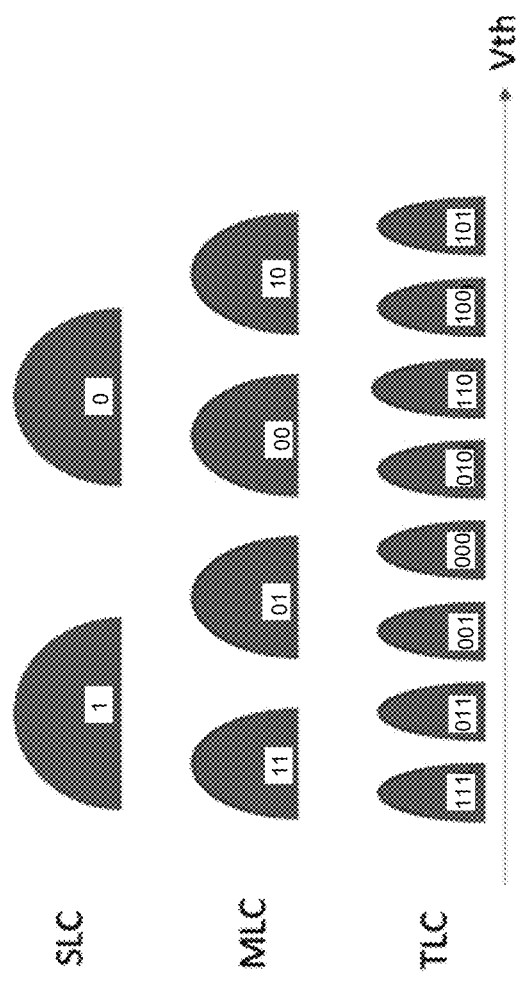
FIGS. 9A to 9C are graphs illustrating examples of voltage thresholds for reading flash memory, according to embodiments.
Figure 9B:
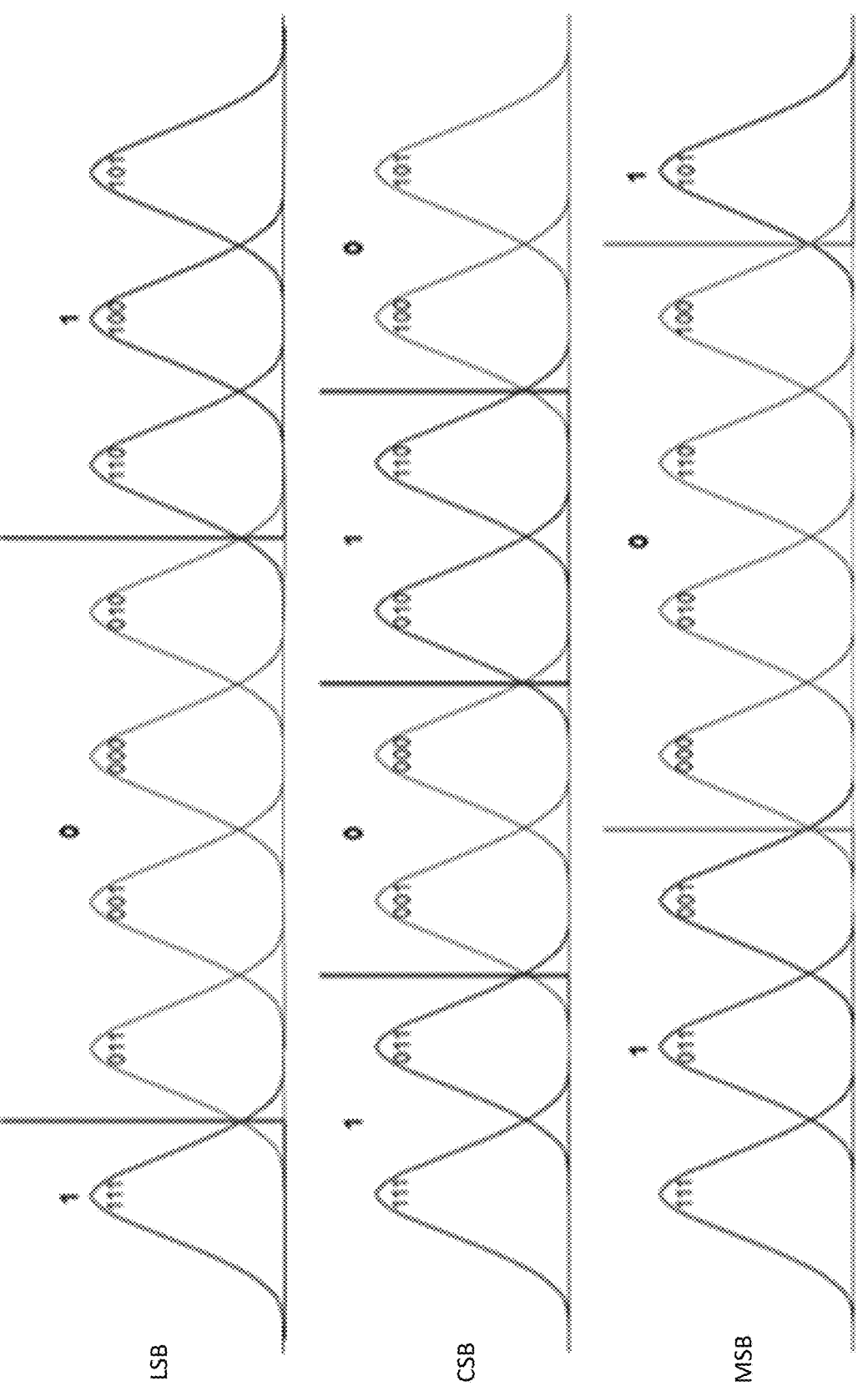
Figure 9C:
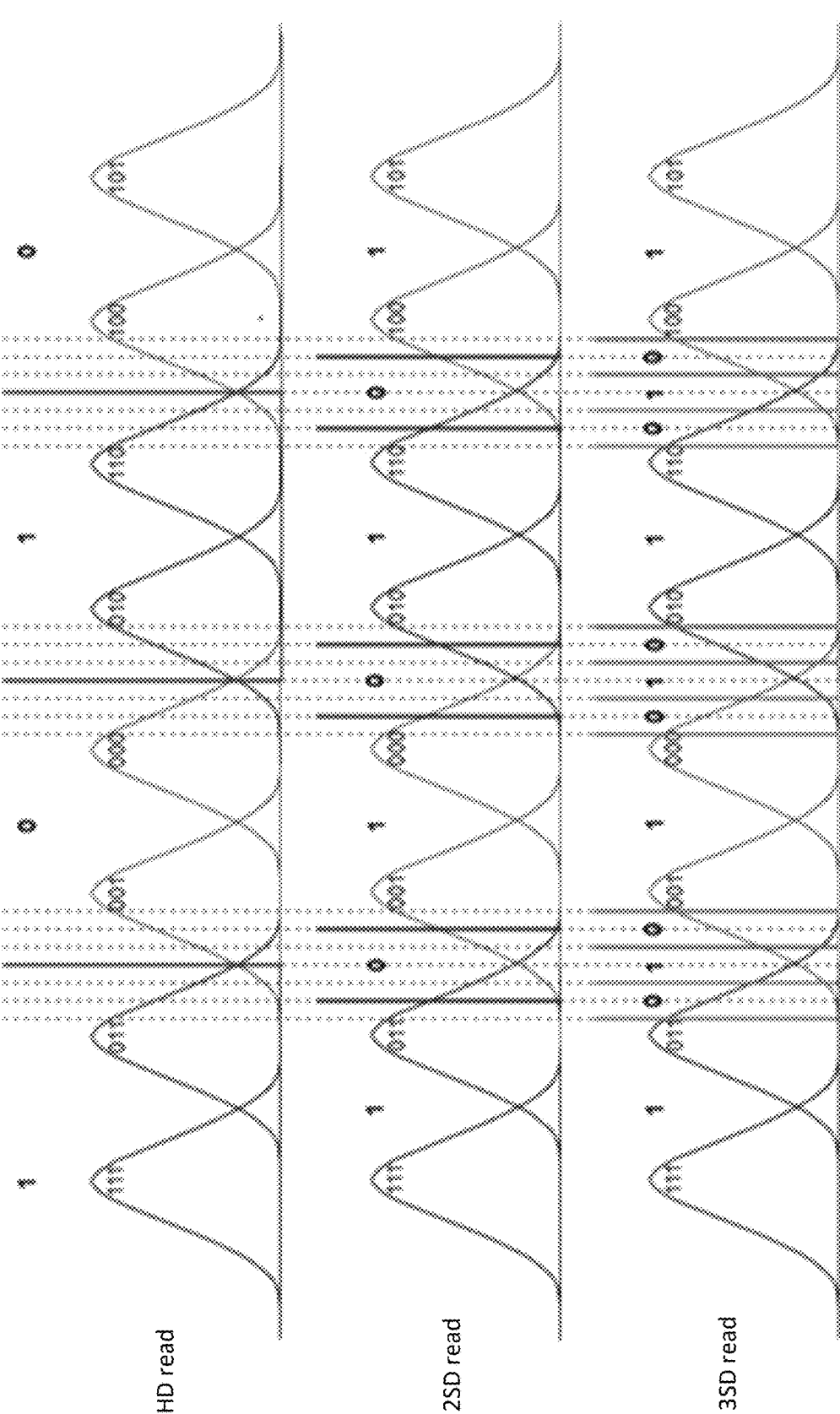

FIGS. 9A to 9C are graphs illustrating examples of voltage thresholds for reading flash memory, according to embodiments. As discussed above, data in storage devices such as flash memory devices may be stored in cells, where each cell may store one or more bits. For example, a SLC may store one bit of information, a MLC may store two bits of information, a TLC may store three bits of information, and a QLC may store four bits per cell.

The stored data in flash memory may be organized in word lines, as discussed above, and each word line may include several pages. For example, an SLC word line may include one page, an MLC word line may include two pages, a TLC may include three pages, and a QLC may include four pages.

FIG. 9A shows an example mapping of bits to cell voltage level for SLC, MLC and TLC memory schemes. In flash memory, the mapping from bits to voltage level may be based on Balanced Gray Code (BGC), in which each potential arrangement of data values that can be stored in a memory cell is mapped to a particular voltage level. Each chunk of information of data, for example 4 KB or 16 KB of data, may be stored in one page, along with some additional overhead bits.

Flash memory may be read by setting several thresholds to read the bits of the desired page. Each page can be decoded using hard decision (HD) decoding or soft decision (SD) decoding. In HD decoding there may be one threshold for each change between '0' to '1' and '1' to '0'. FIG. 9B shows an example of HD thresholds for TLC memory cells for LSB, CSB, and MSB pages.

In SD decoding, there may be additional thresholds for each HD threshold. FIG. 9C shows an example of SD thresholds for TLC memory cells. For example, in 2SD decoding there may be two additional SD thresholds for each HD threshold, for an overall number of $2^2$=4 decision regions around the HD thresholds. In 3SD decoding, there may be six additional SD thresholds for each HD threshold, for an overall number of $2^3$=8 decision regions around the HD thresholds.

Figure 10:
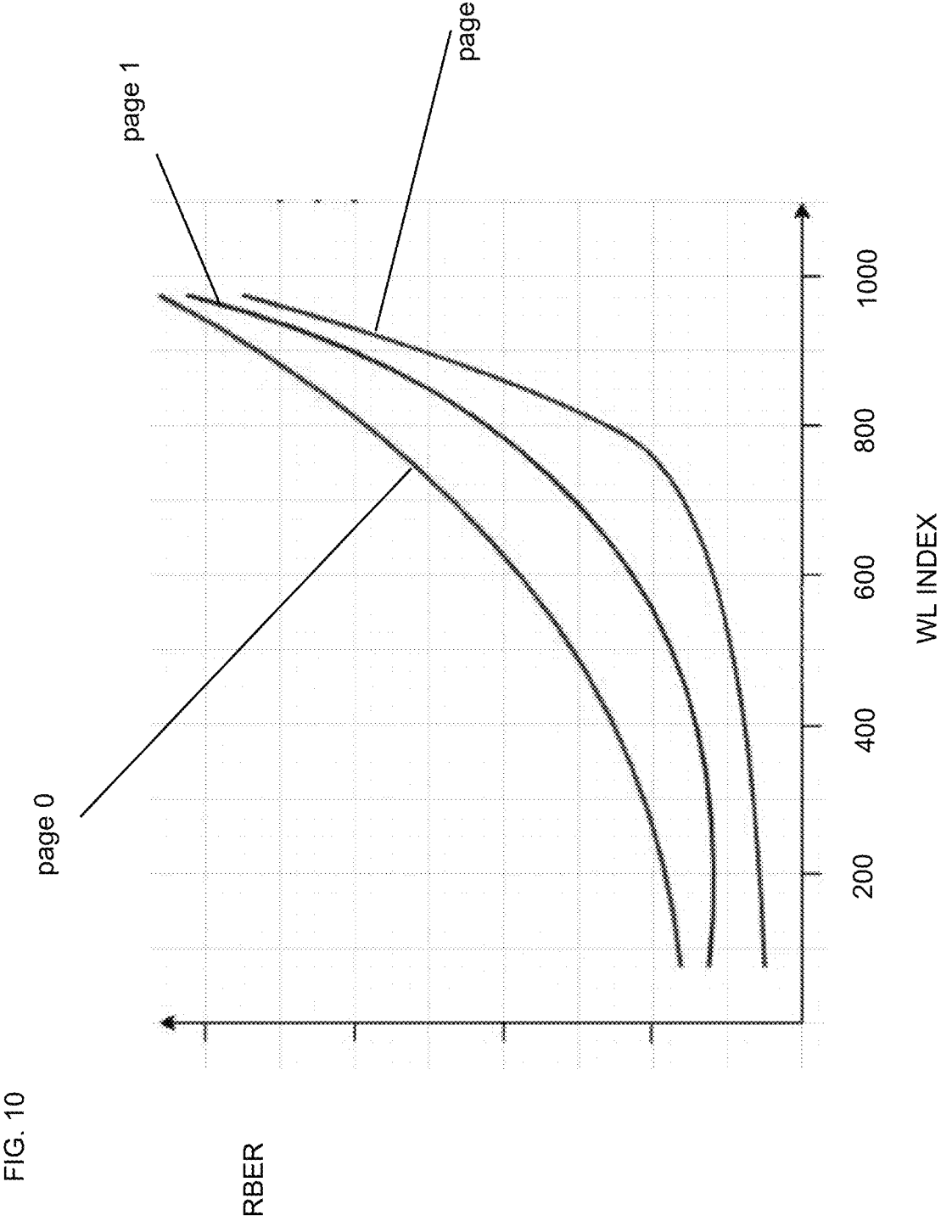
FIG. 10 is a graph illustrating examples of residual bit error rate (RBER) per page, according to embodiments.

FIG. 10 is a graph illustrating examples of residual bit error rate (RBER) in a storage device such as a NAND flash memory device, according to embodiments. As can be seen in FIG. 10, the RBER of various pages (e.g., page 0, page 1, and page 2) may vary considerably across different word lines (e.g., word lines corresponding to indexes 1 through 1000). As can be seen in FIG. 10, the RBER of different pages may vary significantly across the different word line indexes. As discussed above, in some storage devices, all pages in a block may use the same level of protection despite the potentially dramatic variability in pages, which may lead to a reduction in efficiency and reliability.

Therefore, embodiments of the present disclosure may relate to applying different levels of protection for different pages according to the page quality. For example, in embodiments, a different number of parity bits may be allocated to different pages such that the overall number of information bits per block may be preserved. Embodiments may include various encoding and decoding processes, examples of which are discussed in greater detail below. In embodiments, these encoding and decoding schemes may support backwards compatibility for decoding each page separately. In addition, embodiments may include various rate allocation processes and page clustering processes, examples of which are discussed in greater detail below.

According to embodiments, for L parallel channels with conditional distribution $P_{y_i|x_i}$ for i=1, . . . , L, the frame error rate (FER) for decoding each channel may be denoted as $Fer(R_i; P_{y_i|x_i})$. In embodiments, a channel may correspond to a page, but embodiments are not limited thereto. For example, in some embodiments a channel may correspond to a word line, or some other subdivision of a storage device. For convenience, embodiments are described below in terms of pages, but it should be understood that the description may refer equally to channels or word lines, or any other subdivision of a storage device.

The code rates for each page may be allocated such that the overall FER for all pages is minimized according to Equation 1 below, such that Equation 2 below is satisfied:

$$R^0 = \arg\min_{R} \max_{i \in [1, L]} Fer(R_i; P_{y_i|x_i}) \qquad \text{Equation 1}$$

$$\sum_{i=1}^{L} R_i = L\overline{R} \qquad \text{Equation 2}$$

In Equation 1 and Equation 2 above, $R_i$ may denote the code rate for the $i^{th}$ page, $R = [R_1, \ldots, R_L]$, and $\overline{R}$ may denote the nominal code rate per page.

The solution may be given by Equation 3 below, which may be solved such that v satisfies Equation 2 below:

$$R_i = \left[\min\{C_i, Fer^{-1}(v; P_{y_i|x_i})\}\right]^+, i = 1, 2, \ldots, L \qquad \text{Equation 3}$$

In Equation 3 above, $C_i$ may denote the page capacity of the $i^{th}$ page, $v[x]^+ = \max(0, x)$, and v may denote a nonnegative number that satisfies Equation 2 and Equation 3.

Effectively, embodiments may allocate the code rate $R_i$ for each page such that the page with the maximal FER (e.g., the worst page) is minimal. In some embodiments, if designed code rate $R_i$ is above channel capacity $C_i$ the code rate $R_i$ may be set to be $C_i$, and if the designed code rate $R_i$ is less than zero, the code rate $R_i$ may be set to be zero. Example processes for allocating the code rate are discussed in greater detail below.

Figure 11A:
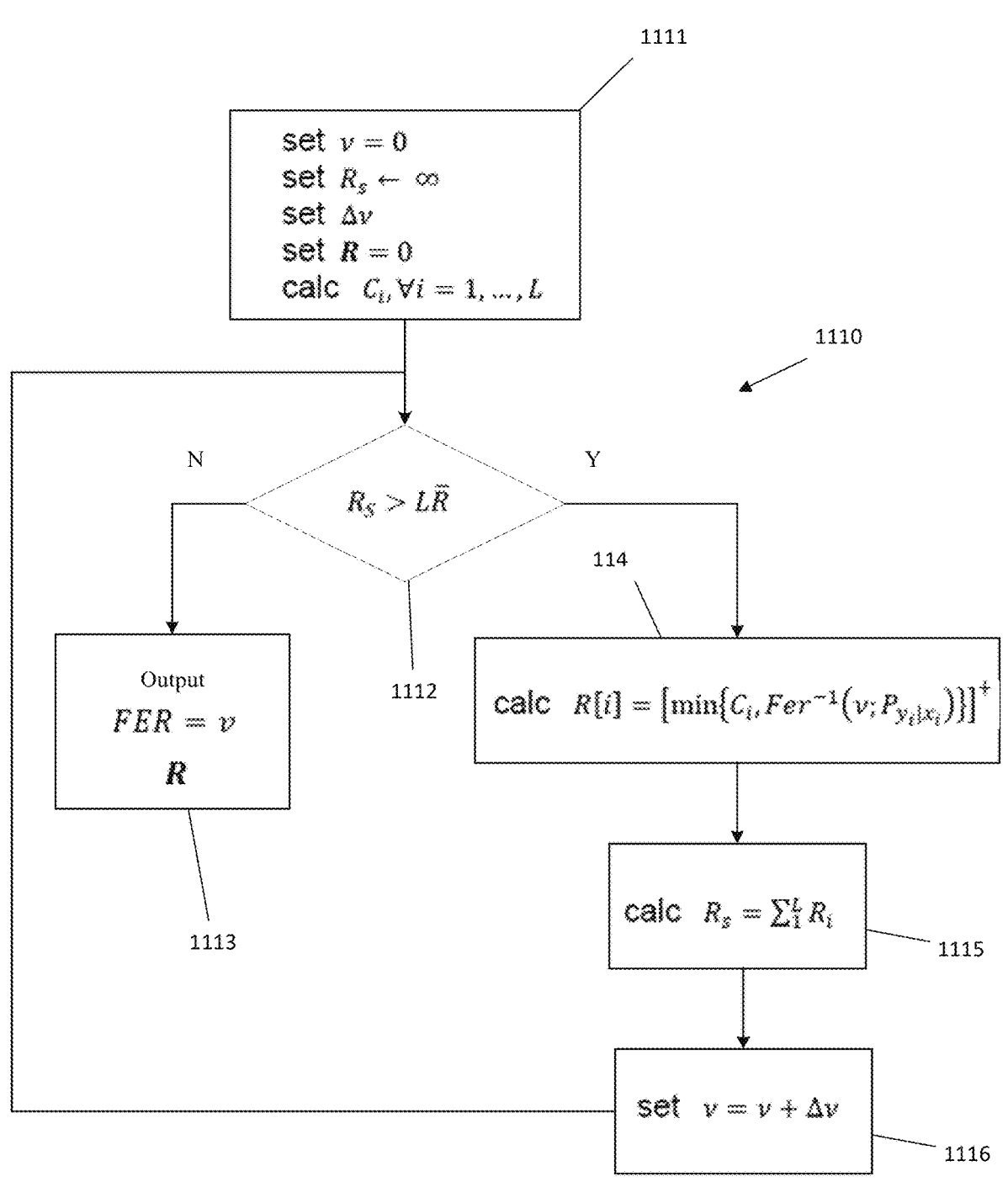
FIGS. 11A and 11B are flowcharts of processes for performing rate allocation, according to embodiments.

FIG. 11A is a flowchart of an example process for performing rate allocation, according to embodiments. In some implementations, one or more process blocks of FIG. 11A may be performed by any of the elements discussed above, for example one or more of the storage device 200 and any of the elements included therein, for example the storage controller 210.

As shown in FIG. 11A, at operation 1111 the process 1110 may be initialized by setting v equal to zero, setting a code rate sum $R_s$ to infinity, setting an increment $\Delta v$ to a small positive number, setting the code rate vector R (including code rates $R_i$ for all pages) to zero, and calculating the channel capacity $C_i$ of each page.

As further shown in FIG. 11A, at operation 1112 the process 1110 may include determining whether the code rate sum $R_s$ is greater than $L\overline{R}$. Based on determining that the code rate sum $R_s$ is not greater than $L\overline{R}$ (N at operation 1112), the process 1110 may determine that an optimal code rate allocation has been reached, and may output the FER, which may be equal to v, may output the code rate vector R, and then may terminate at operation 1113. Based on determining that the code rate sum $R_s$ is greater than $L\overline{R}$ (Y at operation 1112), the process 1110 may proceed to operation 1114.

As further shown in FIG. 11A, at operation 1114 the process 1110 may include calculating the code rate vector R according to Equation 3 based on the current value of v.

As further shown in FIG. 11A, at operation 1115 the process 1110 may include calculating the code rate sum $R_s$ according to Equation 4 below:

$$R_s = \sum_{i=1}^{L} R_i \qquad \text{Equation 4}$$

As further shown in FIG. 11A, at operation 1116 the process 1110 may include incrementing v according to Equation 5 below, and returning to operation 1112.

$$v = v + \Delta v \qquad \text{Equation 5}$$

Figure 11B:
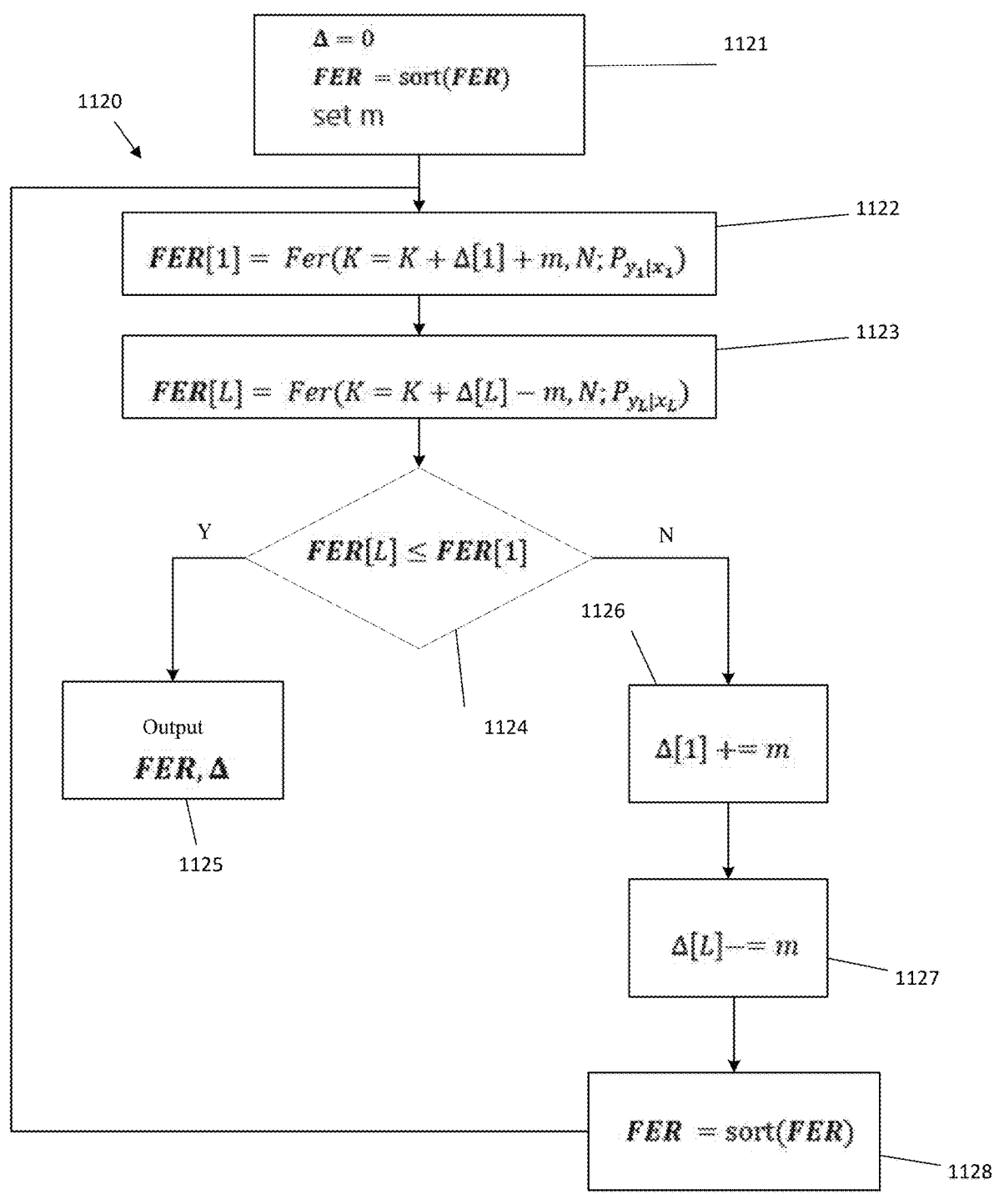

FIG. 11B is a flowchart of another example process for performing rate allocation, according to embodiments. In some implementations, one or more process blocks of FIG. 11B may be performed by any of the elements discussed above, for example one or more of the storage device 200 and any of the elements included therein, for example the storage controller 210.

As shown in FIG. 11B, at operation 1121 the process 1120 may be initialized by setting an overhead allocation vector Δ to zero, sorting a vector FER (including a frame error rate FER[i] for each page) from best to worst (e.g., from lowest to highest), and setting an increment m.

As further shown in FIG. 11B, at operation 1122 the process 1120 may include calculating the lowest frame error rate FER[1] according to Equation 6 below:

$$FER[1] = \left[ Fer\left(K = K + \Delta[1] + m, N; P_{y_1|x_1}\right) \right] \qquad \text{Equation 6}$$

As further shown in FIG. 11B, at operation 1122 the process 1120 may include calculating the highest frame error rate FER[L] according to Equation 7 below:

$$FER[L] = \left[ Fer\left(K = K + \Delta[L] - m, N; P_{y_1|x_1}\right) \right] \qquad \text{Equation 7}$$

As further shown in FIG. 11B, at operation 1124 the process 1120 may include determining whether the highest frame error rate FER[L] is less than or equal to the lowest frame error rate FER[1]. Based on determining that the highest frame error rate FER[L] is less than or equal to the lowest frame error rate FER[1] (Y at operation 1124), the process 1120 may determine that an optimal code rate allocation has been reached, and may terminate at operation 1125. Based on determining that the highest frame error rate FER[L] is not less than or equal to the lowest frame error rate FER[1] (N at operation 1124), the process 1120 may proceed to operation 1126.

As further shown in FIG. 11B, at operation 1126 the process 1120 may include adding m bits to an overhead allocation Δ[1] corresponding to the page having the lowest FER, which may mean for example that the page having the lowest FER will receive m overhead bits from another page to be treated as m additional information bits.

At operation 1127 the process 1120 may include subtracting m bits from an overhead allocation Δ[L] corresponding to the page having the highest FER, which may mean for example that the page having the highest FER will provide m overhead bits to another page, to be treated as m additional information bits by the other page.

In this way, the code rate $R_L$ of the page having the highest FER may be decreased, by transferring overhead information to the page having the lowest FER (which increases the code rate $R_1$ of the page having the lowest FER). Although this example is described in terms of bits, embodiments are not limited thereto. For example, in some embodiments the overhead may be transferred as symbols, etc.

As further shown in FIG. 11B, at operation 1128 the process 1120 may include re-sorting the vector FER from best to worst (e.g., from lowest to highest), and returning to operation 1122.

According to embodiments, after the code rates (or the overhead allocations) are determined for each page, for example according to one of processes 1110 or 1120 discussed above, the pages may be grouped or clustered into good pages and bad pages. In embodiments, good pages may refer to pages which have a code rate that is higher than the nominal code rate $\overline{R}$, and bad pages may refer to pages which have a code rate that is lower than the nominal code rate $\overline{R}$.

Figure 12:
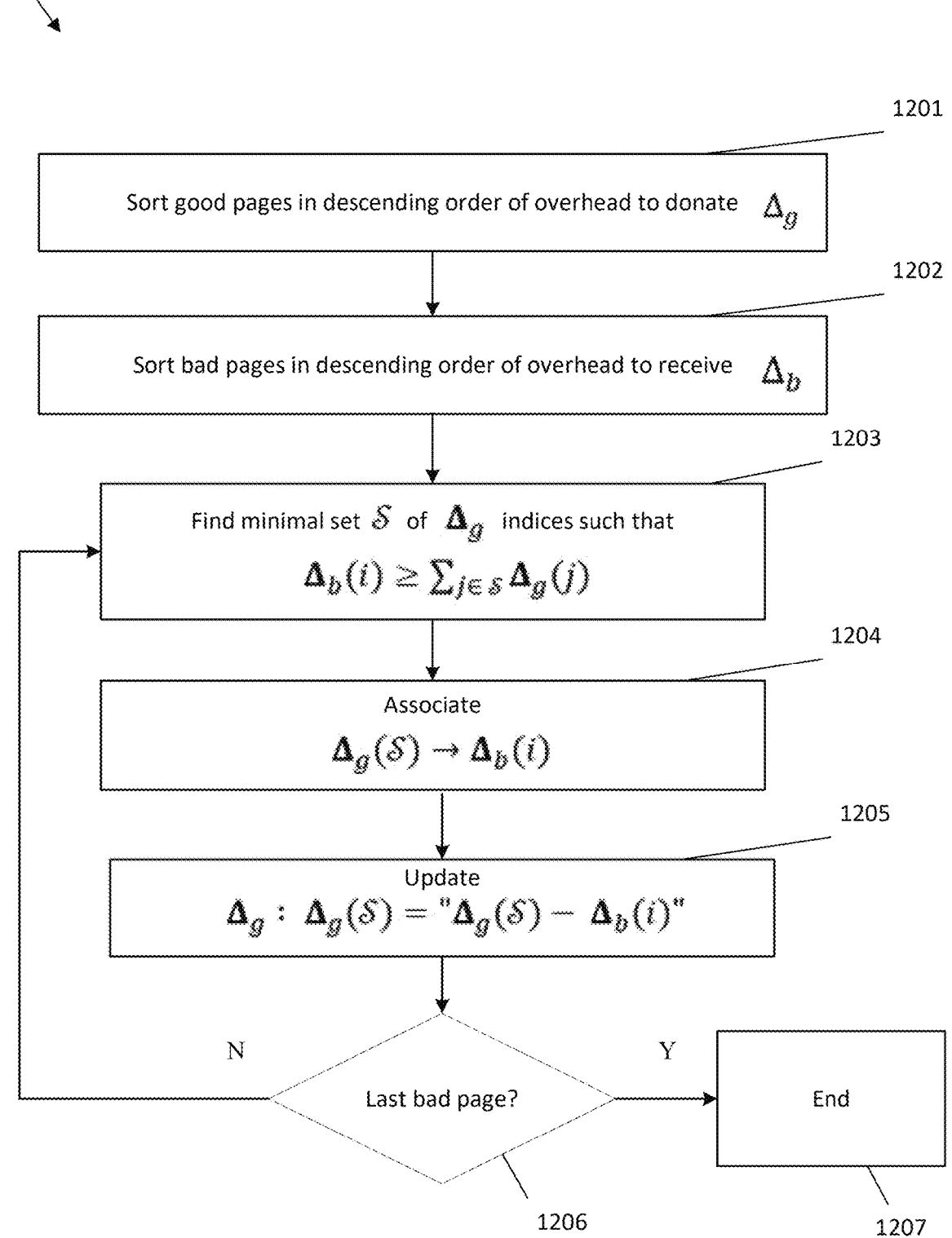
FIG. 12 is a flowchart of a process for performing page clustering, according to embodiments.

FIG. 12 is a flowchart of a process for performing page clustering, according to embodiments. In some implementations, one or more process blocks of FIG. 12 may be performed by any of the elements discussed above, for example one or more of the storage device 200 and any of the elements included therein, for example the storage controller 210.

As shown in FIG. 12, at operation 1201 the process 1200 may include sorting the good pages in a descending order of overhead allocation that is available to donate, which may be denoted $\Delta_g$. In embodiments, this may correspond to sorting the good pages in an ascending order of code rate allocation.

As further shown in FIG. 12, at operation 1202 the process 1200 may include sorting the bad pages in a descending order of overhead allocation to receive, which may be denoted $\Delta_b$. In embodiments, this may correspond to sorting the bad pages in an ascending order of code rate allocation.

As further shown in FIG. 12, at operation 1203 the process 1200 may include, for an $i^{th}$ bad page, finding a minimal set $S$ of $\Delta_g$ such that Equation 8 below is satisfied:

$$\Delta_b(i) \le \sum_{j \in S} \Delta_g(j) \qquad \text{Equation 8}$$

As further shown in FIG. 12, at operation 1204 the process 1200 may include associating the good pages allocation $\Delta_g(S)$ with $\Delta_b(i)$. This may mean that, when the $i^{th}$ bad page is encoded, the overhead bits $\Delta_b(i)$ will be transferred to $\Delta_g(S)$ of the good pages corresponding to $S$.

As further shown in FIG. 12, at operation 1205 the process 1200 may include updating $\Delta_g(S)$ by subtracting the bits allocated for the $i^{th}$ bad page according to Equation 9 below:

$$\Delta_g(S) = \text{``}\Delta_g(S) - \Delta_b(i)\text{''} \qquad \text{Equatiom 9}$$

As further shown in FIG. 12, at operation 1206 the process 1200 may include determining whether a last bad page has been reached. Based on determining that additional bad pages remain (N at operation 1206), the process 1200 may perform operations 1203, 1204, and 1205 on a next bad page. Accordingly, operations 1203, 1204, and 1205 may be repeated for each $\Delta_b(i)$ until all of the bad pages are associated with at least one good page. Based on determining that the last bad page has been reached (Y at operation 1206), the process 1200 may end at operation 1207.

According to embodiments, after the code rates is determined, and the good pages are associated with the bad pages, the data to be stored in the pages may be decoded. Two example encoding and decoding schemes are presented below, the first scheme in FIGS. 13A to 13C, and the second scheme in FIGS. 14A to 14B. Both of these schemes are described in terms of the code rate allocation and clustering processes described above, but embodiments are not limited thereto, and any code rate allocation processes and clustering processes may be used. According to embodiments, the schemes discussed below may support encoding and decoding each page independently with no cooperation gain.

Figure 13A:
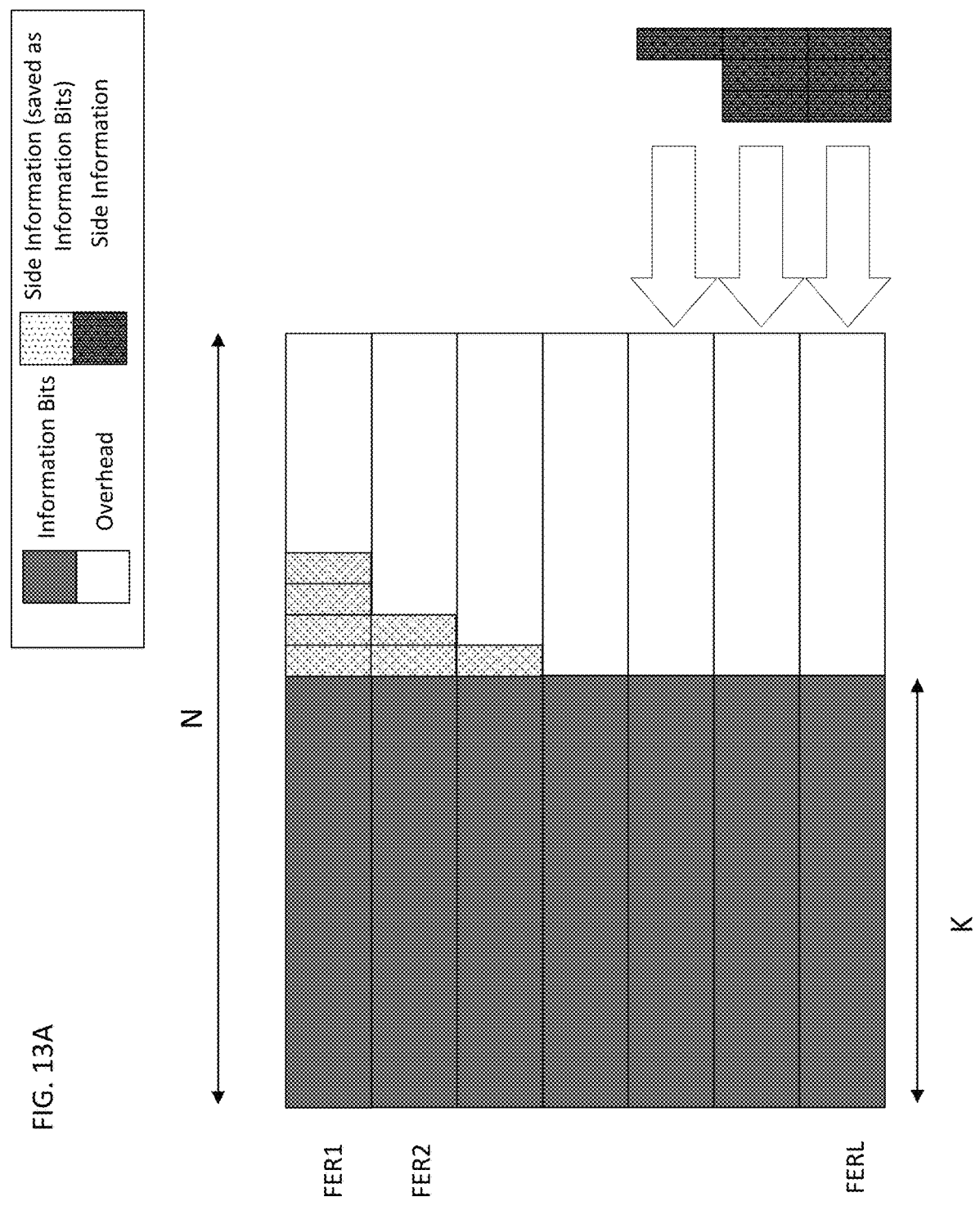
FIG. 13A is a diagram illustrating encoding and decoding processes corresponding to a first scheme, according to embodiments.

FIG. 13A is a diagram illustrating example encoding and decoding processes corresponding to the first scheme, according to embodiments. As can be seen in FIG. 13A, L pages having length N may be sorted in an order of ascending FER, and additional overhead information, which may be referred to as side information, may be generated by bad pages having a higher FER. This side information may be added to good pages having a lower FER, and may be encoded along with the data to be stored in the good pages.

Figure 13B:
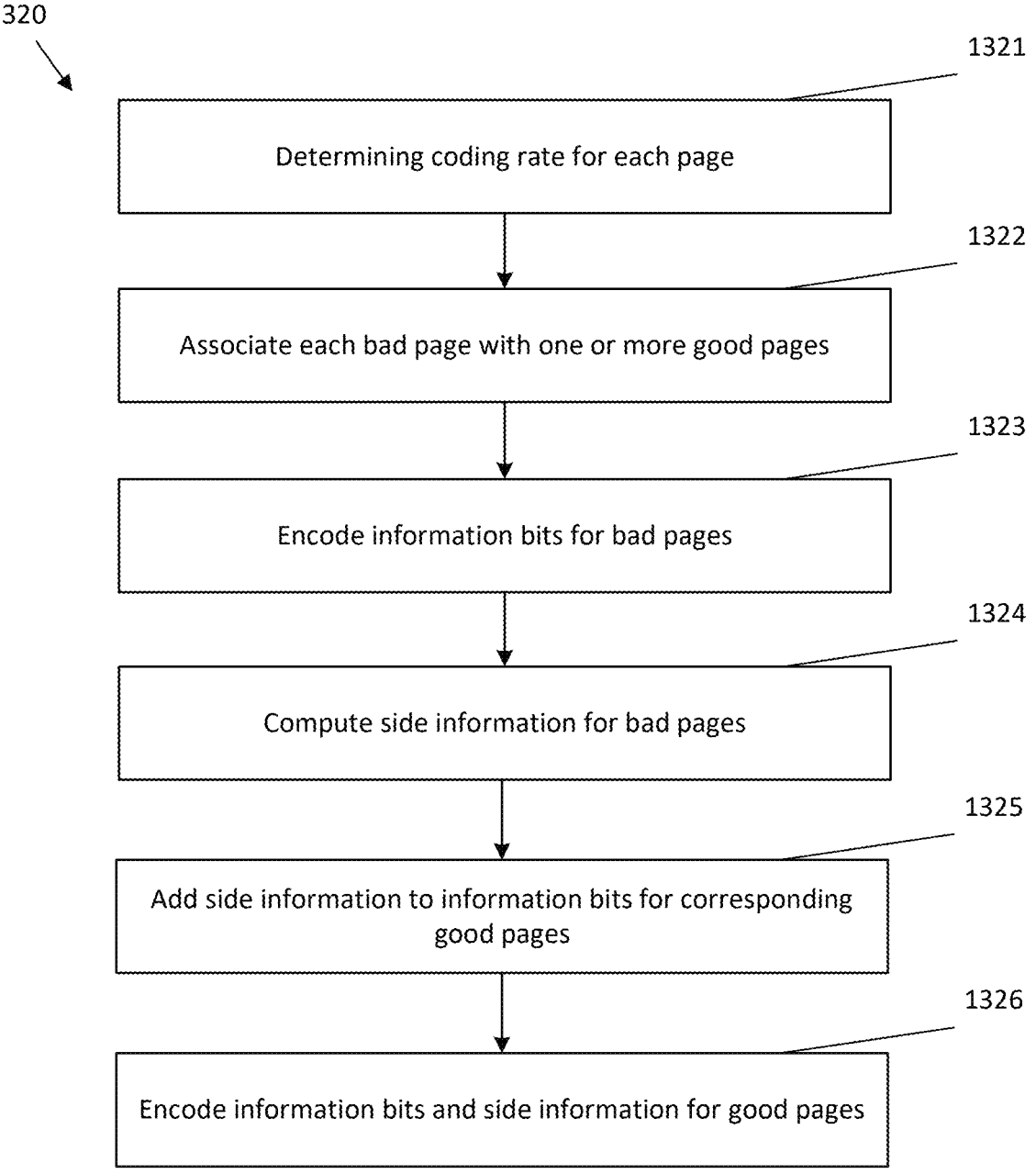
FIG. 13B is a flowchart of an encoding process for a single block corresponding to the first scheme, according to embodiments.

FIG. 13B is a diagram illustrating an example encoding process corresponding to the first scheme, according to embodiments. In some implementations, one or more process blocks of FIG. 13B may be performed by any of the elements discussed above, for example one or more of the storage device 200 and any of the elements included therein, for example the storage controller 210.

As shown in FIG. 13B, at operation 1321 the process 1320 may include determining a code rate for each page. In embodiments, the code rates may be determined according to at least one of process 1110 and process 1120 discussed above, but embodiments are not limited thereto.

As further shown in FIG. 13B, at operation 1322 the process 1320 may include associating each bad page with one or more good pages. In embodiments, this associating may correspond to the clustering process 1200 discussed above, but embodiments are not limited thereto.

As further shown in FIG. 13B, at operation 1323 the process 1320 may include encoding information bits corresponding to the bad pages. In embodiments, the bad pages may be encoded for example using the nominal code rate $\bar{R}$.

As further shown in FIG. 13B, at operation 1324 the process 1320 may include computing side information for the bad pages. In embodiments, this side information may be additional overhead bits generated by encoding the bad pages, but embodiments are not limited thereto. For each bad page, side information may be computed to be provided to the corresponding at least one good page. In embodiments, the side information may be, for example, delta syndromes which are computed for the bad pages, but embodiments are not limited thereto.

As further shown in FIG. 13B, at operation 1325 the process 1320 may include adding the side information to information bits of the corresponding good pages, based on the page associations determined in operation 1322.

As further shown in FIG. 13B, at operation 1326 the process 1320 may include encoding the information bits and side information of the good pages. In embodiments, the code rate for the $i^{th}$ good page may be $R_i$, which may satisfy Equation 10 below:

$$R_i = \frac{K + \Delta_i}{N} \qquad \text{Equation 10}$$

In embodiments, K may denote the number of information bits, and $\Delta_i$ may denote the number of additional bits of the side information added to the $i^{th}$ good page.

Accordingly, the additional overhead generated by encoding the bad pages, may be distributed in the form of side information among the good pages and encoded such that a FER of all of the pages is as close as possible.

Figure 13C:
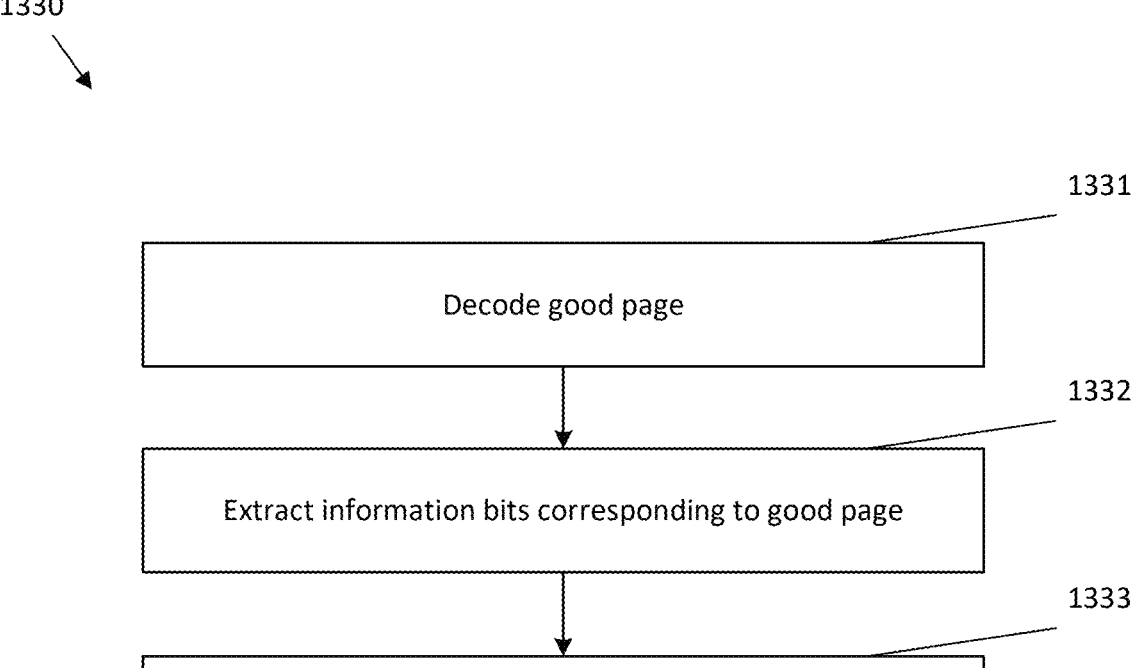
FIG. 13C is a flowchart of a decoding process for a good page corresponding to the first scheme, according to embodiments.

FIG. 13C is a flowchart of a decoding process for a good page corresponding to the first scheme, according to embodiments. In some implementations, one or more process blocks of FIG. 13C may be performed by any of the elements discussed above, for example one or more of the storage device 200 and any of the elements included therein, for example the storage controller 210. In embodiments, the process 1330 shown in FIG. 13C may be used to decode good pages which are encoded according to the process 1320 shown in FIG. 13B.

As shown in FIG. 13C, at operation 1331 the process 1330 may include decoding a good page, for example a good page corresponding to a particular bad page. In embodiments, the good page may be decoded using the corresponding code rates $R_i$ discussed above.

As further shown in FIG. 13C, at operation 1332 the process 1330 may include extracting the information bits corresponding to the decoded good page.

As further shown in FIG. 13C, at operation 1333 the process 1330 may include extracting the side information corresponding to the decoded good page.

In some embodiments, operations 1332 and 1333 may be included in operation 1331.

Figure 13D:
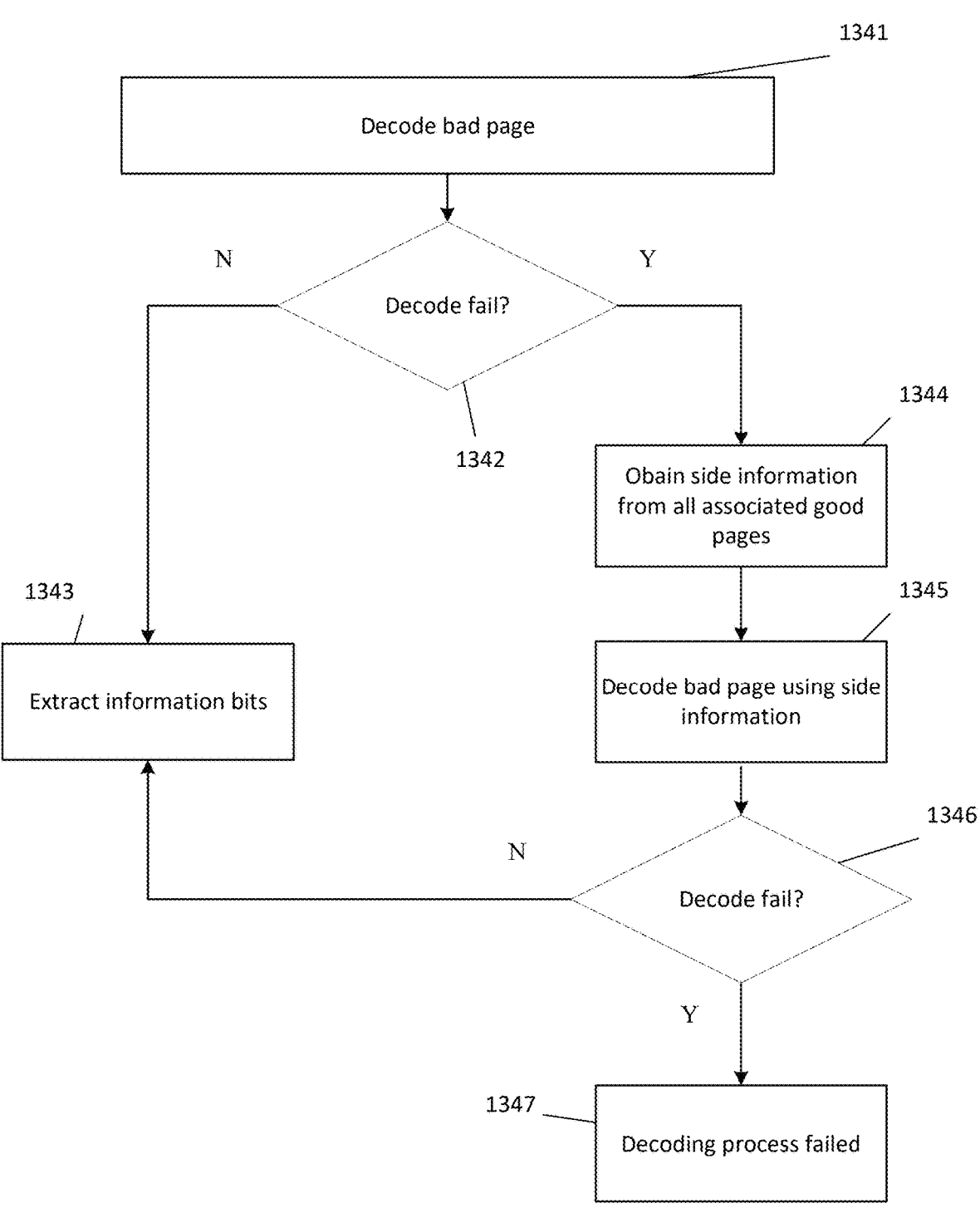
FIG. 13D is a flowchart of a decoding process for a bad page corresponding to the first scheme, according to embodiments.

FIG. 13D is a flowchart of a decoding process for a bad page corresponding to the first scheme, according to embodiments. In some implementations, one or more process blocks of FIG. 13D may be performed by any of the elements discussed above, for example one or more of the storage device 200 and any of the elements included therein, for example the storage controller 210. In embodiments, the process 1340 shown in FIG. 13D may be used to decode bad pages which are encoded according to the process 1320 shown in FIG. 13B.

As shown in FIG. 13D, at operation 1341 the process 1340 may include decoding a bad page. In embodiments, the bad page may be the $i^{th}$ bad page, which may be decoding using the code rate $R_i$ corresponding to the $i^{th}$ bad page.

As further shown in FIG. 13D, at operation 1342 the process 1340 may include determining whether the decoding of the bad page failed. Based on determining that the decoding did not fail (N at operation 1342), the process 1340 may proceed to operation 1343, at which the information bits corresponding to the bad page may be extracted, and then may proceed to decode the next bad page (or the next good page, if any good pages remain). Based on determining that the decoding failed (Y at operation 1342), the process 1340 may proceed to operation 1344.

As further shown in FIG. 13D, at operation 1344 the process 1340 may include obtaining the side information extracted from the all of the decoded good pages associated with the bad page.

As further shown in FIG. 13D, at operation 1345 the process 1340 may include decoding the bad page using the side information obtained in operation 1344.

As further shown in FIG. 13D, at operation 1346 the process 1340 may include determining whether the decoding of the bad page failed. Based on determining that the decoding did not fail (N at operation 1346), the process 1340 may proceed to operation 1343, at which the information bits corresponding to the bad page may be extracted, and then may proceed to decode the next bad page (or the next good page, if any good pages remain). Based on determining that the decoding failed (Y at operation 1346), the process 1340 may proceed to operation 1347, and may determine that the decoding of the process 1340 has failed.

Figure 14A:
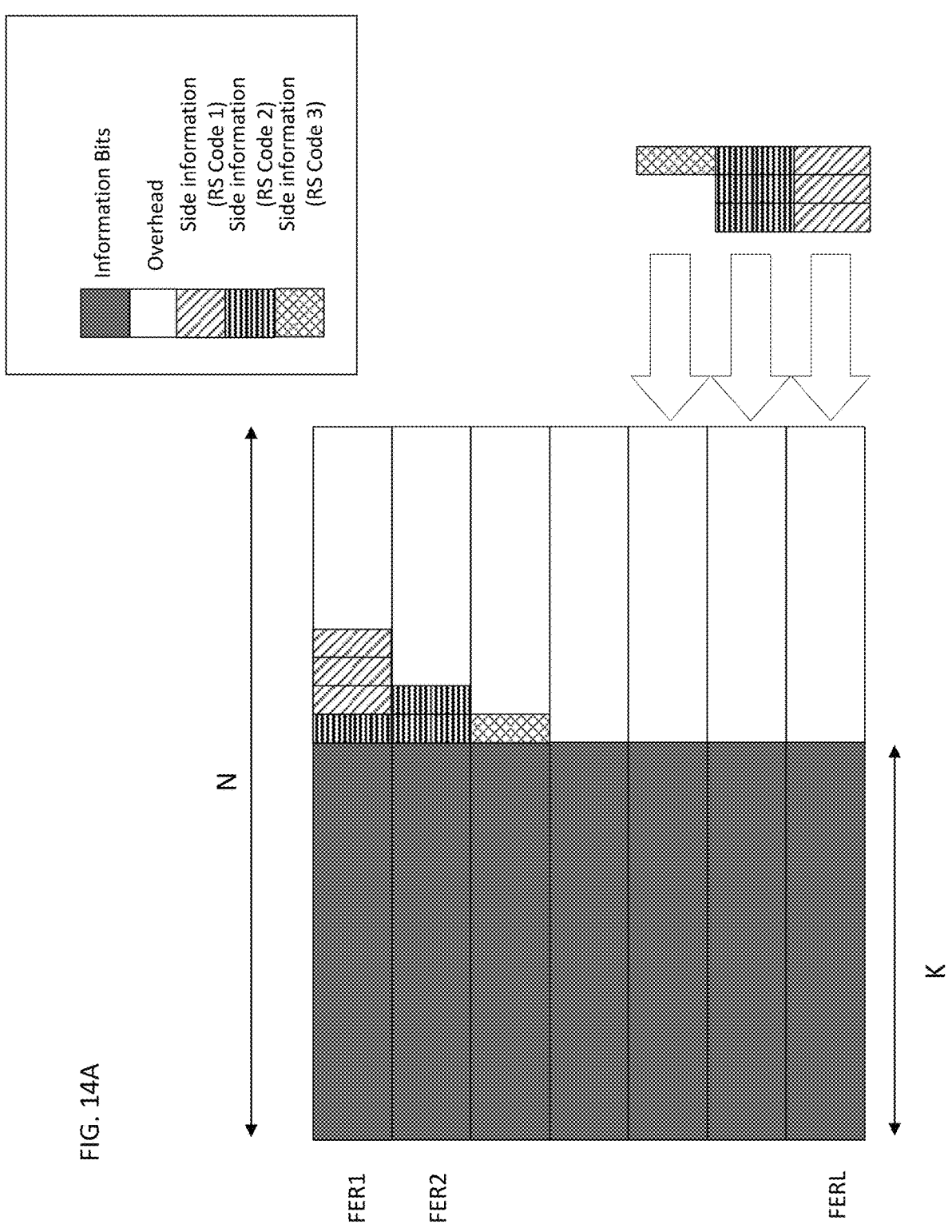
FIG. 14A is a diagram illustrating encoding and decoding processes corresponding to a second scheme, according to embodiments.

FIG. 14A illustrates example encoding and decoding processes corresponding to the second scheme, according to embodiments. In embodiments, the encoding and decoding processes of FIGS. 14A to 14C may be similar to the encoding and decoding scheme of FIGS. 13A to 13C, except that the side information of FIGS. 14A to 14C may be additionally encoded. As can be seen in FIG. 14A, L pages having length N may be sorted in an order of ascending FER, and side information may be generated by bad pages having a higher FER. This side information may be additionally encoded, for example using first, second, and third Reed-Solomon (RS) codes. The encoded side information may be added to good pages having a lower FER, and may be encoded along with the data to be stored in the good pages.

Figure 14B:
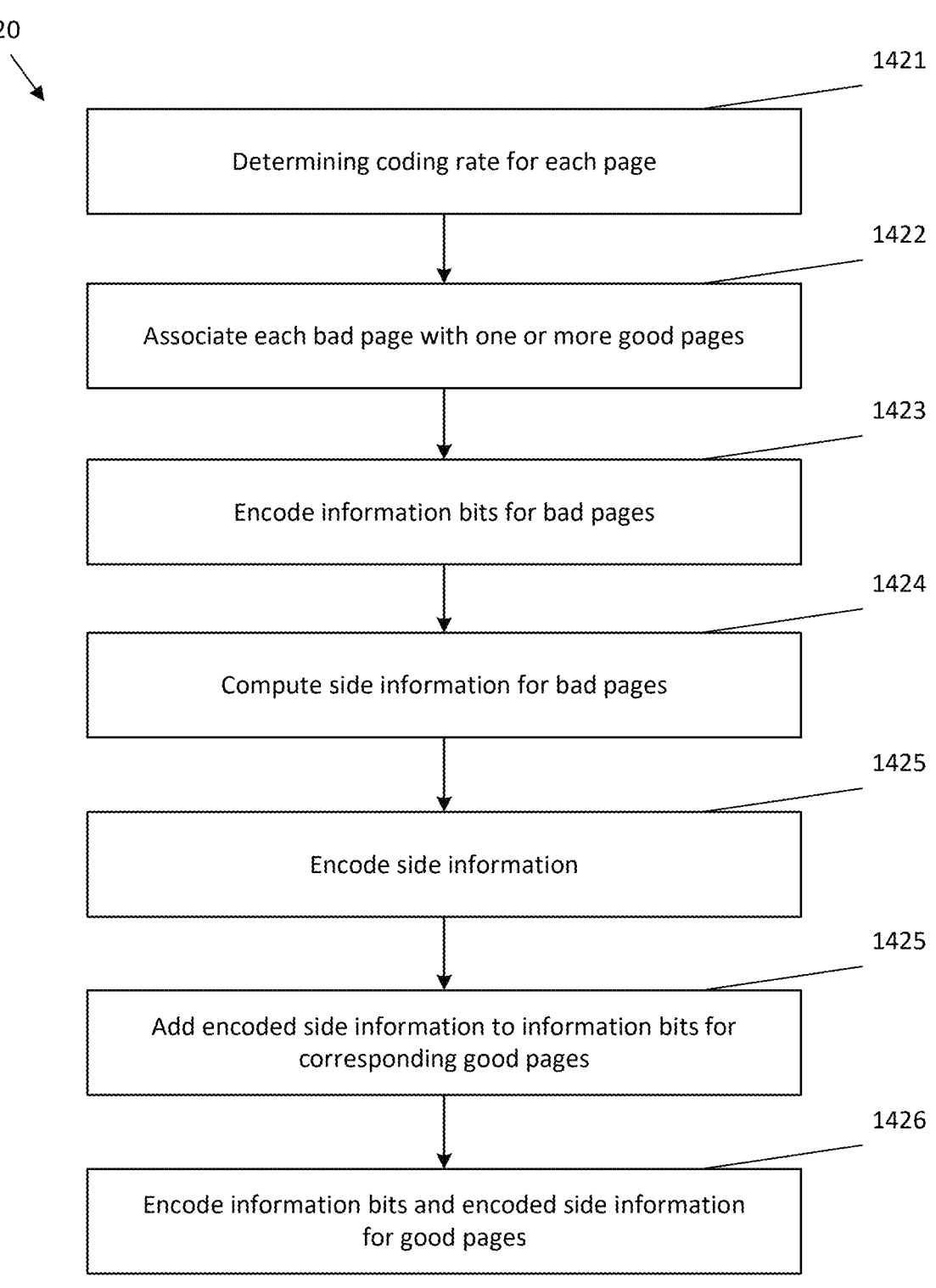
FIG. 14B is a flowchart of an encoding process corresponding to the second scheme, according to embodiments.

FIG. 14B is a diagram illustrating an example encoding process, according to embodiments. In some implementations, one or more process blocks of FIG. 14B may be performed by any of the elements discussed above, for example one or more of the storage device 200 and any of the elements included therein, for example the storage controller 210.

As shown in FIG. 14B, at operation 1421 the process 1420 may include determining a code rate for each page. In embodiments, the code rates may be determined according to at least one of process 1110 and process 1120 discussed above, but embodiments are not limited thereto.

As further shown in FIG. 14B, at operation 1422 the process 1420 may include associating each bad page with one or more good pages. In embodiments, this associating may correspond to the clustering process 1200 discussed above, but embodiments are not limited thereto.

As further shown in FIG. 14B, at operation 1423 the process 1420 may include encoding information bits corresponding to the bad pages. In embodiments, the bad pages may be encoded for example using the nominal code rate R.

As further shown in FIG. 14B, at operation 1424 the process 1420 may include computing side information for the bad pages. In embodiments, this side information may be additional overhead bits generated by encoding the bad pages, but embodiments are not limited thereto. For each bad page, side information may be computed to be provided to the corresponding at least one good page.

As further shown in FIG. 14B, at operation 1425 the process 1420 may include encoding the side information.

As further shown in FIG. 14B, at operation 1426 the process 1420 may include adding the encoded side information to information bits of the corresponding good pages, based on the page associations determined in operation 1422.

As further shown in FIG. 14B, at operation 1426 the process 1420 may include encoding the information bits and side information of the good pages. In embodiments, the code rate for the i$^{th}$ good page may be R$_i$, which may satisfy Equation 10 above.

Accordingly, the additional overhead generated by encoding the bad pages, may be encoded and then distributed in the form of encoded side information among the good pages and encoded such that a FER of all of the pages is as close as possible.

Figure 14C:
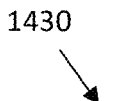
FIG. 14C is a flowchart of a decoding process for a good page corresponding to the second scheme, according to embodiments.

FIG. 14C is a flowchart of a decoding process for a good page corresponding to the second scheme, according to embodiments. In some implementations, one or more process blocks of FIG. 14C may be performed by any of the elements discussed above, for example one or more of the storage device 200 and any of the elements included therein, for example the storage controller 210. In embodiments, the process 1430 shown in FIG. 14C may be used to decode good pages which are encoded according to the process 1420 shown in FIG. 14B.

As shown in FIG. 14C, at operation 1431 the process 1430 may include decoding a good page, for example a good page corresponding to a particular bad page. In embodiments, the good page may be decoded using the corresponding code rates R$_i$ discussed above.

As further shown in FIG. 14C, at operation 1432 the process 1430 may include extracting the information bits corresponding to the decoded good page.

As further shown in FIG. 14C, at operation 1433 the encoded side information corresponding to the decoded good page may be extracted.

In some embodiments, operations 1432 and 1433 may be included in operation 1431.

Figure 14D:
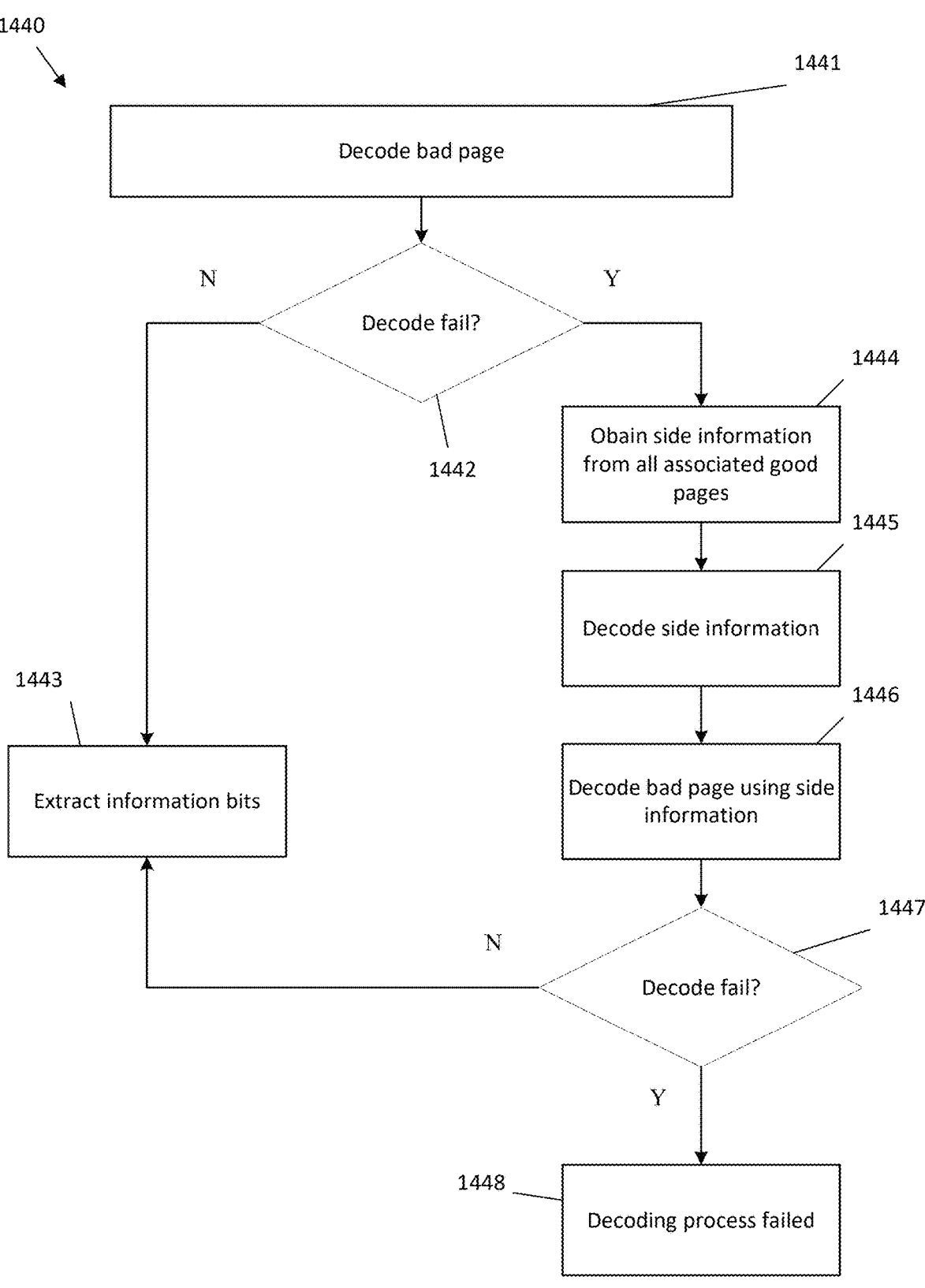
FIG. 14D is a flowchart of a decoding process for a bad page corresponding to the second scheme, according to embodiments.

FIG. 14D is a flowchart of a decoding process for a bad page corresponding to the second scheme, according to embodiments. In some implementations, one or more process blocks of FIG. 14D may be performed by any of the elements discussed above, for example one or more of the storage device 200 and any of the elements included therein, for example the storage controller 210. In embodiments, the process 1440 shown in FIG. 14D may be used to decode bad pages which are encoded according to the process 1420 shown in FIG. 14B.

As further shown in FIG. 14D, at operation 1441 the process 1440 may include decoding a bad page. In embodiments, the bad page may be the i$^{th}$ bad page, which may be decoding using the code rate R$_i$ corresponding to the i$^{th}$ bad page.

As further shown in FIG. 14D, at operation 1442 the process 1440 may include determining whether the decoding of the bad page failed. Based on determining that the decoding did not fail (N at operation 1442), the process 1440 may proceed to operation 1443, at which the information bits corresponding to the bad page may be extracted, and then may proceed to decode the next bad page (or the next good page, if any good pages remain). Based on determining that the decoding failed (Y at operation 1442), the process 1440 may proceed to operation 1444.

As further shown in FIG. 14D, at operation 1444 the process 1440 may include obtaining the encoded side information extracted from the all of the decoded good pages associated with the bad page.

As further shown in FIG. 14D, at operation 1445 the process 1440 may include decoding the encoded side information.

As further shown in FIG. 14D, at operation 1446 the process 1440 may include decoding the bad page using the decoded side information obtained in operation 1436. Based on the decoding succeeding, the process 1440 may proceed to operation 1435.

As further shown in FIG. 14D, at operation 1447 the process 1440 may include determining whether the decoding of the bad page failed. Based on determining that the decoding did not fail (N at operation 1447), the process 1440 may proceed to operation 1443, at which the information bits corresponding to the bad page may be extracted, and then may proceed to decode the next bad page (or the next good page, if any good pages remain). Based on determining that the decoding failed (Y at operation 1447), the process 1440 may proceed to operation 1448, and may determine that the decoding of the process 1440 has failed.

Figure 15A:
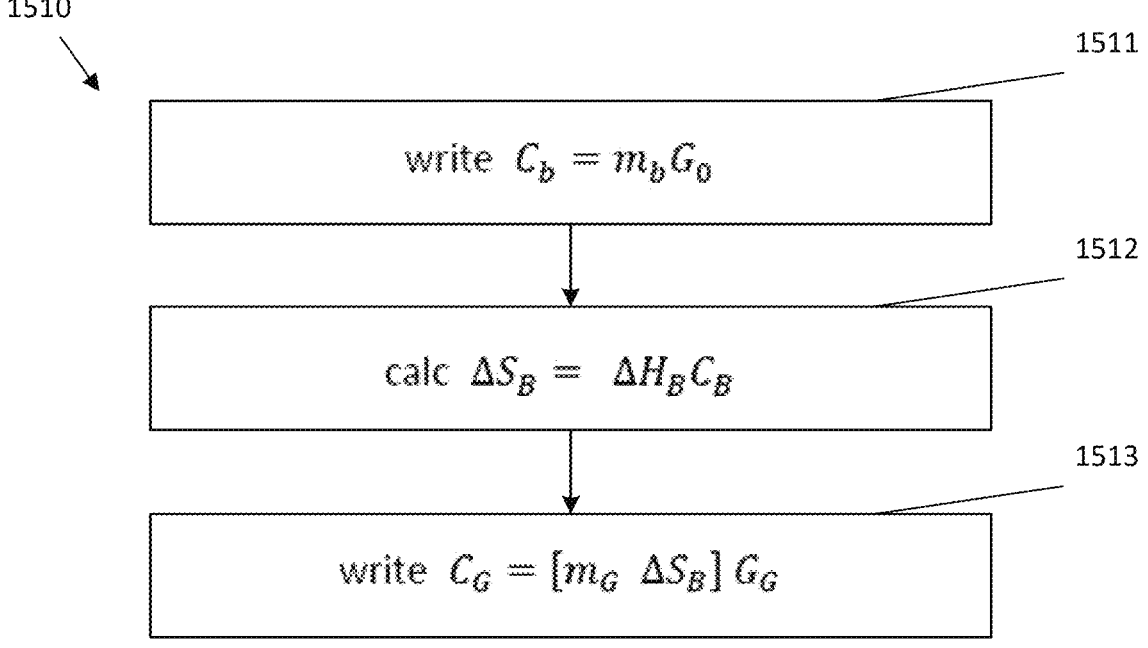
FIG. 15A is a flowchart of an example implementation of an encoding process corresponding to the second scheme, according to embodiments.
Figure 15B:
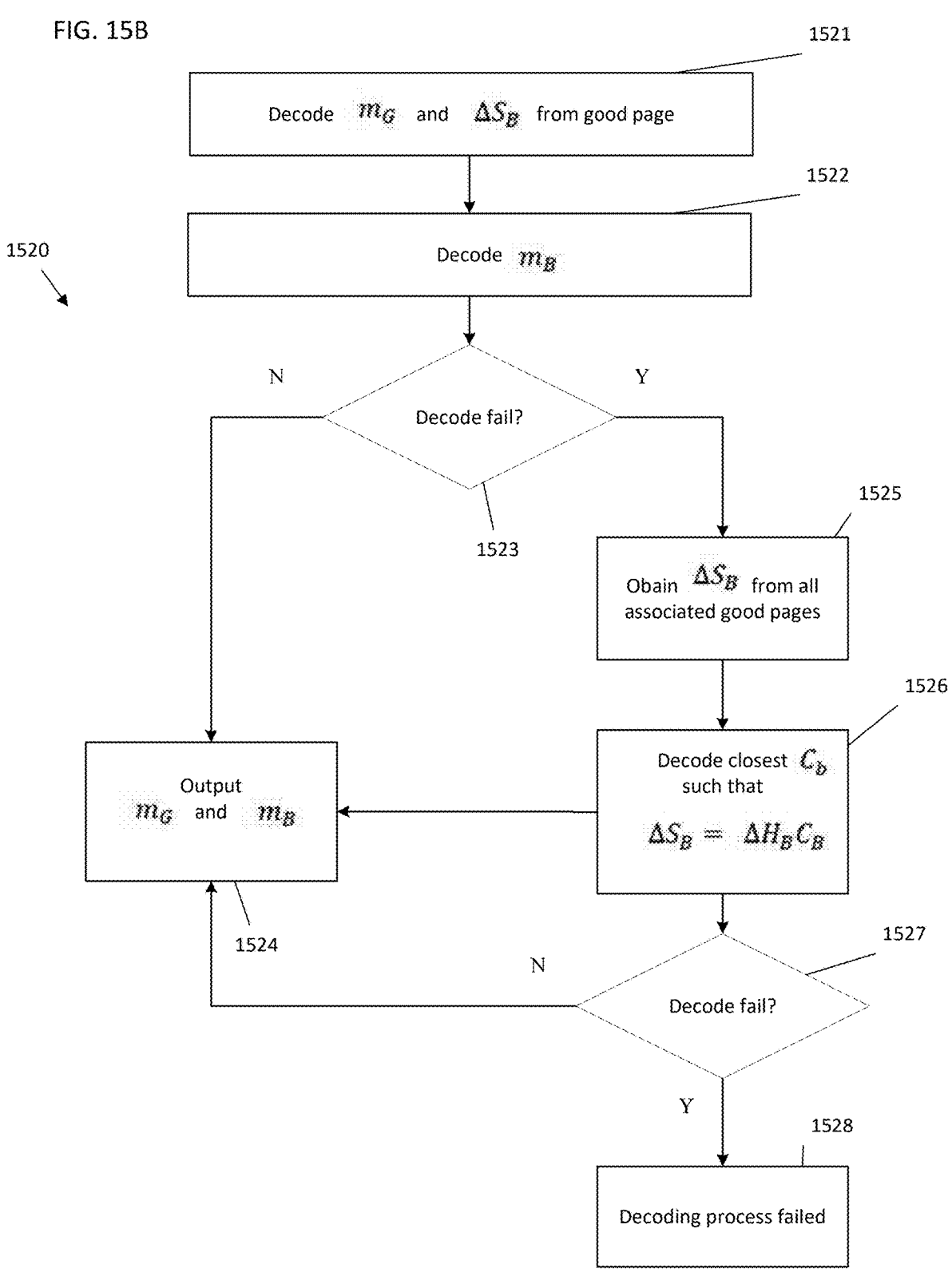
FIG. 15B is a flowchart of an example implementation of a decoding process corresponding to the second scheme, according to embodiments.

FIGS. 15A and 15B show an example implementation of encoding and decoding processes corresponding to an example of the second scheme in which delta syndromes are used as side information. For convenience of description, in the example shown in FIGS. 15A and 15B, each bad page is associated with a single good page, but embodiments are not limited thereto. In this example, implementation, three nested linear codes $\mathcal{C}_B \subset \mathcal{C}_0 \subset \mathcal{C}_G$ are used, with generator matrices $G_B$, $G_0$, $G_G$ and parity check matrices $H_B$, $H_0$, $H_G$. In embodiments, $\mathcal{C}_0$ may denote the nominal code for a page, which may have 4 KB information bits, $C_B$ may denote a linear code with code rate which is below the nominal rate (e.g., the rate of code $C_0$), and $C_G$ may denote a linear code with code rate which is above the nominal rate (e.g., the rate of code $C_0$). Accordingly, $G_0$ may denote the generator matrix of code $\mathcal{C}_0$, $G_B$ may denote the generator matrix of code $\mathcal{C}_B$, and $G_G$ may denote the generator matrix of code $\mathcal{C}_G$. Further, $H_0$ may denote the party check matrix of code $\mathcal{C}_0$, $H_B$ may denote the parity check matrix of code $\mathcal{C}_B$, and $H_G$ may denote the parity check matrix of code $\mathcal{C}_G$ Equation 11 below may represent the nested structure:

$$H_B = \begin{bmatrix} H_0 \\ \Delta H_B \end{bmatrix} \qquad \text{Equation 11}$$

Further, $m_b$ may denote the information bits for the bad pages, and $m_G$ may denote the information bits for the good pages.

FIG. 15A is a flowchart of an example implementation of an encoding process corresponding to the second scheme, according to embodiments. In some implementations, one or more process blocks of FIG. 15A may be performed by any of the elements discussed above, for example one or more of the storage device 200 and any of the elements included therein, for example the storage controller 210.

As shown in FIG. 15A, at operation 1511 the process 1510 may include encoding the information bits $m_b$ to determine a code word $C_b$ for each bad page according to Equation 12 below:

$$C_b = m_b G_0 \qquad \text{Equation 12}$$

As further shown in FIG. 15A, at operation 1512 the process 1510 may include calculating the delta syndromes $\Delta S_B$ for each bad page as shown in Equation 13 below:

$$\Delta S_B = \Delta H_B C_B \qquad \text{Equation 13}$$

In embodiments, the delta syndromes $\Delta S_B$ may correspond to the side information discussed above.

As further shown in FIG. 15A, at operation 1513 the process 1510 may include adding the delta syndromes $\Delta S_B$ to the information bits $m_G$, and encoding the information bits $m_G$ and the delta syndromes $\Delta S_B$ together to determine a code word $C_G$ for each good page according to Equation 14 below:

$$C_G = [m_G \quad \Delta S_B] G_G \qquad \text{Equation 14}$$

FIG. 15B is a flowchart of a side information decoding process corresponding to the second scheme, according to embodiments. In some implementations, one or more process blocks of FIG. 15B may be performed by any of the elements discussed above, for example one or more of the storage device 200 and any of the elements included therein, for example the storage controller 210.

As shown in FIG. 15B, at operation 1521 the process 1520 may include decoding at least one code word $C_G$ to obtain the information bits mg and the delta syndromes $\Delta S_B$.

As further shown in FIG. 15B, at operation 1522 the process 1520 may include decoding a code word $C_b$ corresponding to bad page, for example a bad page corresponding to the at least one good page, to obtain the information bits to obtain the information bits $m_b$.

As further shown in FIG. 15B, at operation 1523 the process 1520 may include determining whether the decoding of the bad page failed. Based on determining that the decoding did not fail (N at operation 1523), the process 1520 may proceed to operation 1524, which may include outputting the information bits $m_G$ and the information bits $m_b$, and then may proceed to decode the next bad page (or the next at least one good page, if any good pages remain). Based on determining that the decoding failed (Y at operation 1523), the process 1520 may proceed to operation 1525.

As further shown in FIG. 15B, at operation 1525 the process 1520 may include obtaining the delta syndromes $\Delta S_B$ from the all of the decoded good pages associated with the bad page.

As further shown in FIG. 15B, at operation 1526 the process 1520 may include decoding the closest code word $C_b$ such that Equation 13 above is satisfied. Based on the decoding succeeding, the process 1520 may proceed to operation 1524.

As further shown in FIG. 15B, at operation 1527 the process 1520 may include determining whether the decoding of the closest code word $C_b$ failed. Based on determining that the decoding did not fail (N at operation 1527), the process 1520 may proceed to operation 1524, at which the information bits corresponding to the bad page may be extracted, and then may proceed to decode the next bad page (or the next at least one good page, if any good pages remain). Based on determining that the decoding failed (Y at operation 1527), the process 1520 may proceed to operation 1528, and may determine that the decoding of the process 1520 has failed.

As discussed above with respect to FIGS. 14A to 14C, in some embodiments the delta syndromes $\Delta S_B$ may be further encoded, for example using RS codes, and the encoded delta syndromes may be added to the information bits $m_G$ of associated good pages before being encoded in operation 1513. Accordingly, operation 1525 may further include decoding the encoded delta syndromes $\Delta S_B$. In embodiments, RS codes may have any code rate. For example, based on any side information symbol having exactly one symbol, the code rate of the RS codes may be half of the code rate of the associated good pages.

Figure 16B:
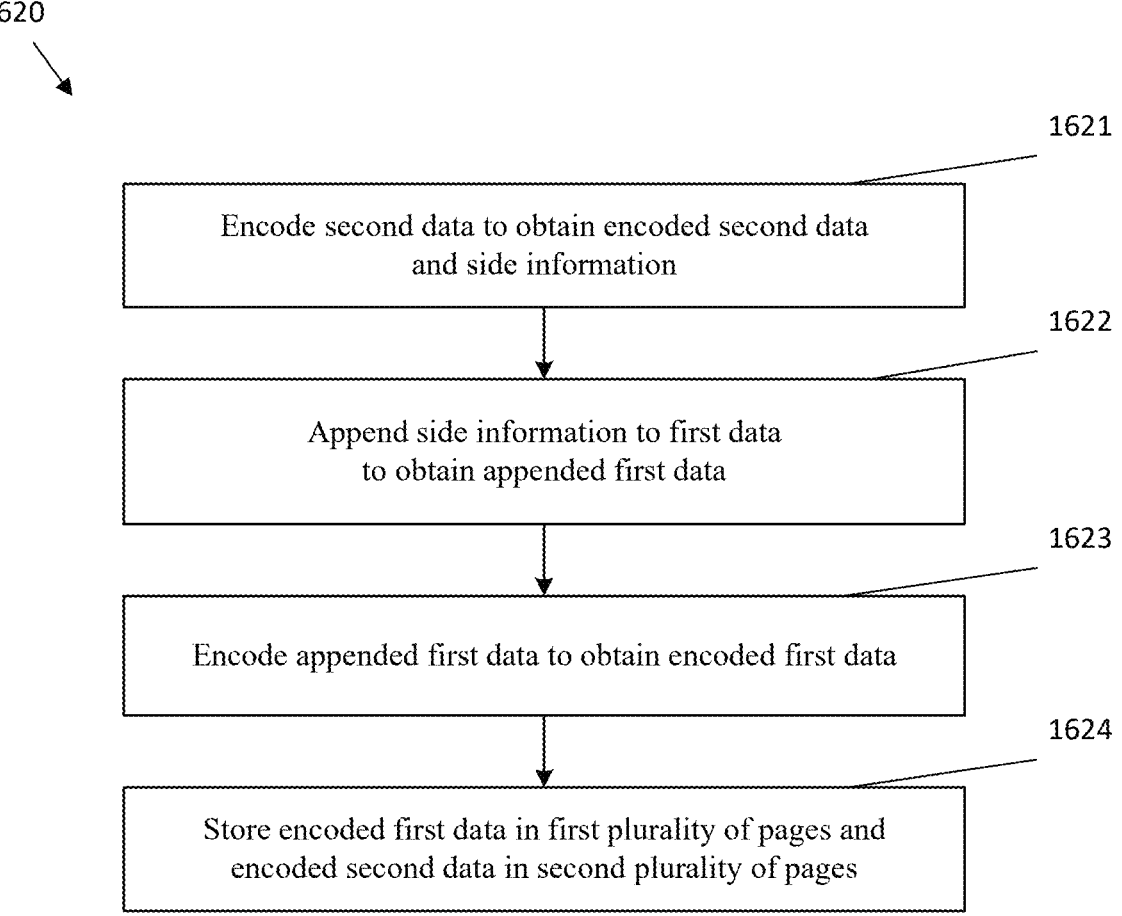

FIGS. 16A-16C are flowcharts of processes for controlling a storage system, according to embodiments. In some implementations, one or more process blocks of FIGS. 16A-16C may be performed by any of the elements discussed above, for example one or more of the storage device 200 and any of the elements included therein, for example the storage controller 210.

As shown in FIG. 16A, at operation 1611 the process 1610 may include allocating a plurality of code rates to a plurality of pages included in a non-volatile memory. In embodiments, the allocating may be performed according to at least one of the process 1110 and the process 1120 discussed above.

As further shown in FIG. 16A, at operation 1612 the process 1610 may include clustering the plurality of pages into a first plurality of pages and a second plurality of pages based on the plurality of code rates. In embodiments, the first plurality of pages may correspond to the good pages discussed above, and the second plurality of pages may correspond to the bad pages discussed above.

As further shown in FIG. 16A, at operation 1613 the process 1610 may include determining a plurality of page associations such that each second page from the second plurality of pages with at least one first page from the first plurality of pages. In embodiments, the plurality of page associations may be determined according to the process 1200 discussed above.

As further shown in FIG. 16A, at operation 1614 the process 1610 may include encoding data based on the plurality of code rates to generate encoded data, wherein the encoding comprises obtaining side information corresponding to the second plurality of pages and transferring the side information to the first plurality of pages.

As further shown in FIG. 16A, at operation 1615 the process 1610 may include storing the encoded data in the plurality of pages.

In embodiments, the plurality of code rates may be determined based on page characteristic information of each page of the plurality of pages.

In embodiments, the side information may be transferred such that frame error rates of the plurality of pages are as equal as possible.

In embodiments, the data may include first data to be stored in the first plurality of pages, and second data to be stored in the second plurality of pages. In embodiments, the first data may correspond to information bits to be stored in the good pages, and the second data may correspond to information bits to be stored in the bad pages.

As shown in FIG. 16B, at operation 1621 the process 1620 may include encoding the second data to obtain encoded second data and the side information.

As further shown in FIG. 16B, at operation 1622 the process 1620 may include appending the side information to the first data to obtain appended first data. The appending may correspond to adding the side information to information bits corresponding to the good pages.

As further shown in FIG. 16B, at operation 1623 the process 1620 may include encoding the appended first data to obtain encoded first data.

As further shown in FIG. 16B, at operation 1624 the process 1620 may include storing the encoded first data in the first plurality of pages and the encoded second data in the second plurality of pages.

As shown in FIG. 16C, at operation 1631 the process 1630 may include obtaining the encoded first data from the first plurality of pages and the encoded second data from the second plurality of pages.

As further shown in FIG. 16C, at operation 1632 the process 1630 may include decoding the encoded first data to obtain the appended first data.

As further shown in FIG. 16C, at operation 1633 the process 1630 may include, based on a failure decoding the encoded second data, extracting the side information from the appended first data, and decoding the encoded second data based on the side information.

As further shown in FIG. 16C, at operation 1634 the process 1630 may include obtaining the data based on the appended first data and the second data. In embodiments, obtaining the data may correspond to extracting the information bits corresponding to the good pages after decoding the good pages, and extracting the information bits corresponding to the bad pages after decoding the bad pages.

Although FIGS. 11A-11B, 12, 13B-13C, 14B-14C, 15A-15B, and 16A-16C show example blocks of processes 1110, 1120, 1200, 1320, 1330, 1420, 1430, 1510, 1520, 1610, 1620, and 1630, in some implementations, the processes 1110, 1120, 1200, 1320, 1330, 1420, 1430, 1510, 1520, 1610, 1620, and 1630 may include additional blocks, fewer blocks, different blocks, or differently arranged blocks than those depicted in FIGS. 11A-11B, 12, 13B-13C, 14B-14C, 15A-15B, and 16A-16C. Additionally, or alternatively, two or more of the blocks of the processes 1110, 1120, 1200, 1320, 1330, 1420, 1430, 1510, 1520, 1610, 1620, and 1630 may be arranged or combined in any order, or performed in parallel.

Figure 17:
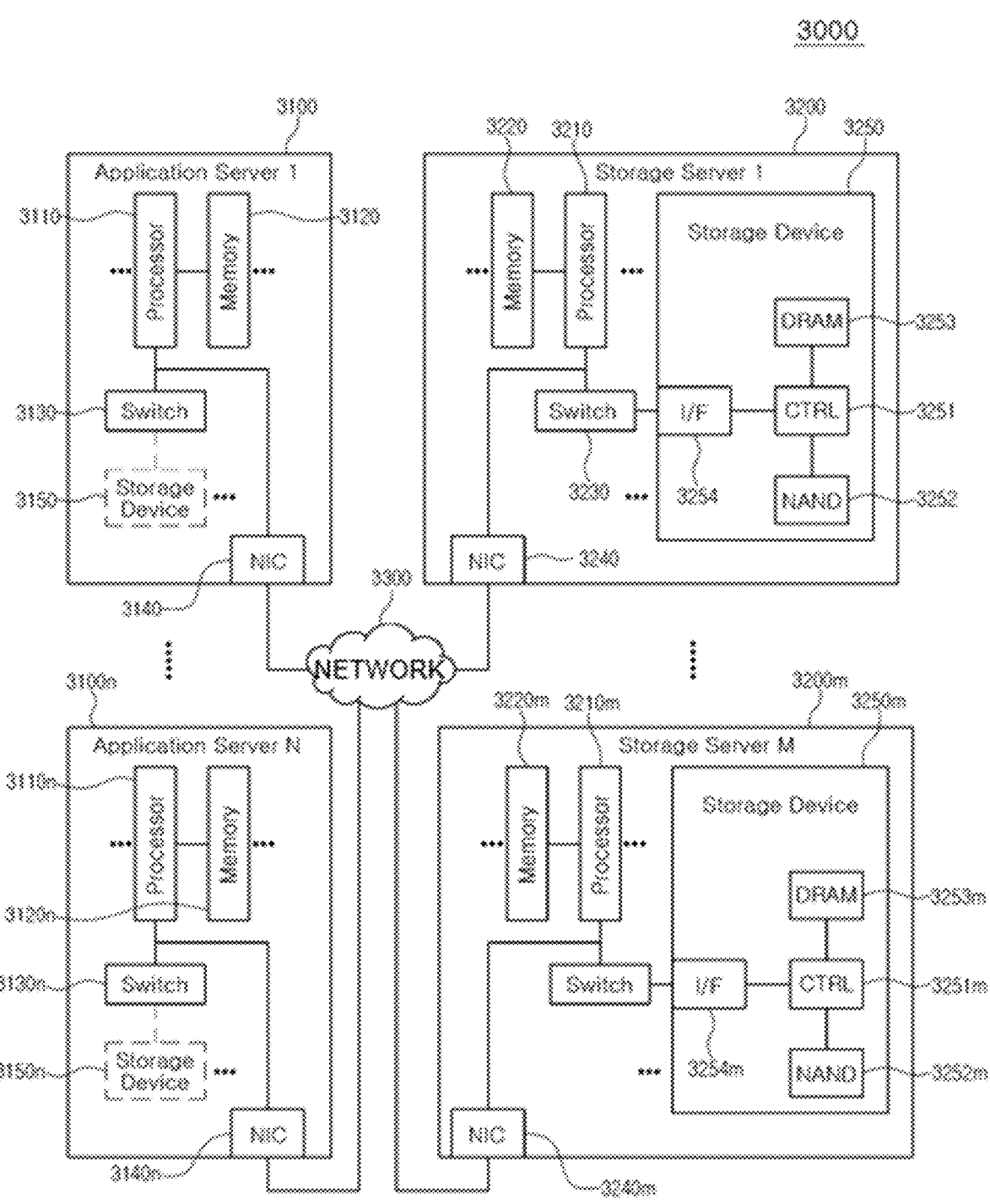
FIG. 17 is a block diagram of data center, according to embodiments.

FIG. 17 is a diagram of a data center 3000 to which a memory device is applied, according to embodiments.

Referring to FIG. 17, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In embodiments, the processor 3210 and the memory 3220 may provide a processor-memory pair. In embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In embodiments, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of certain embodiments and is not to be construed as limiting thereof. Although a few embodiments have been described, those skilled in the art will readily appreciate that many modifications are possible in the embodiments without materially departing from the present scope.

What is claimed is:

1. A storage device, comprising:
a non-volatile memory comprising a plurality of pages; and
a storage controller:
wherein the storage controller is configured to:
allocate a plurality of code rates to the plurality of pages, cluster the plurality of pages into a first plurality of pages and a second plurality of pages based on the plurality of code rates,
determine a plurality of page associations such that each second page from the second plurality of pages is associated with at least one first page from the first plurality of pages,
encode data based on the plurality of code rates to generate encoded data, wherein the encoding comprises obtaining side information corresponding to the second plurality of pages and transferring the side information to the first plurality of pages, and
store the encoded data in the plurality of pages.

2. The storage device of claim 1, wherein the plurality of code rates are determined based on page characteristic information of each page of the plurality of pages.

3. The storage device of claim 1, wherein the side information is transferred such that differences between frame error rates of the plurality of pages are reduced.

4. The storage device of claim 1, wherein to allocate the plurality of code rates, the storage controller is further configured to:
calculate a plurality of frame error rates corresponding to the plurality of pages,
sort the plurality of pages in an order of the plurality of frame error rates, and
based on a highest frame error rate from among the plurality of frame error rates being greater than a lowest frame error rate from among the plurality of frame error rates, iteratively subtract an overhead allocation from a page corresponding to the lowest frame error rate and add the overhead allocation to a page corresponding to the highest frame error rate, until the highest frame error rate is less than or equal to the lowest frame error rate.

5. The storage device of claim 4, wherein the first plurality of pages correspond to a plurality of first code rates, and the second plurality of pages correspond to a plurality of second code rates, and
wherein the plurality of first code rates are higher than a predetermined threshold rate, and the plurality of second code rates are lower than the predetermined threshold rate.

6. The storage device of claim 1, wherein the data comprises first data to be stored in the first plurality of pages, and second data to be stored in the second plurality of pages, and
wherein to encode the data, the storage controller is further configured to:
encode the second data to obtain encoded second data and the side information,
append the side information to the first data to obtain appended first data,
encode the appended first data to obtain encoded first data, and
store the encoded first data in the first plurality of pages and the encoded second data in the second plurality of pages.

7. The storage device of claim 6, wherein to decode the encoded data, the storage controller is further configured to:
obtain the encoded first data from the first plurality of pages and the encoded second data from the second plurality of pages;
decode the encoded first data to obtain the appended first data;

based on a failure decoding the encoded second data, extract the side information from the appended first data, and decode the encoded second data based on the side information; and obtain the data based on the appended first data and the second data.

8. The storage device of claim 6, wherein the storage controller is further configured to encode the side information to obtain encoded side information, and to append the encoded side information to the first data to obtain the appended first data.

9. The storage device of claim 8, wherein the side information is encoded using a first code, and the first data and the encoded side information are encoded using a second code different from the first code.

10. A storage controller for controlling a storage device, the storage controller comprising:

at least one processor configured to:

obtain page characteristic information corresponding to a plurality of pages, sort the plurality of pages into a first plurality of pages and a second plurality of pages based on the page characteristic information, determine a plurality of page associations such that each second page of the second plurality of pages is associated with at least one first page of the first plurality of pages, encode data to generate encoded data, transfer a plurality of additional overhead bits from the second plurality of pages to the first plurality of pages based on the plurality of page associations, and store the encoded data in the plurality of pages.

11. The storage controller of claim 10, wherein the at least one processor is further configured to:

calculate a plurality of frame error rates corresponding to the plurality of pages based on the page characteristic information, sort the plurality of pages in an order of the plurality of frame error rates, based on a highest frame error rate from among the plurality of frame error rates being greater than a lowest frame error rate from among the plurality of frame error rates, perform an allocation process comprising:

allocating an additional overhead bit of a page corresponding to the highest frame error rate to a page corresponding to the lowest frame error rate, and re-sorting the plurality of pages in the order of the plurality of frame error rates, and repeat the allocation process until the highest frame error rate is less than or equal to the lowest frame error rate.

12. The storage controller of claim 10, wherein the data comprises first data chunks to be stored in the first plurality of pages and second data chunks to be stored in the second plurality of pages, and wherein to encode the data, the at least one processor is further configured to:

encode the second data chunks to obtain encoded second data chunks and the plurality of additional overhead bits, distribute the plurality of additional overhead bits among the first data chunks based on the plurality of page associations to obtain appended first data chunks, encode the appended first data chunks to obtain encoded first data chunks, and store the encoded first data chunks in the first plurality of pages and the encoded second data chunks in the second plurality of pages.

13. The storage controller of claim 12, wherein to decode the encoded data, the storage controller is further configured to:

obtain the encoded first data chunks from the first plurality of pages and the encoded second data chunks from the second plurality of pages, decode the encoded first data chunks to obtain the appended first data chunks, based on a failure decoding the encoded second data chunks, extract the plurality of additional overhead bits from the appended first data chunks, and decode the encoded second data chunks based on the plurality of additional overhead bits, and obtain the data based on the appended first data chunks and the second data chunks.

14. The storage controller of claim 12, wherein the storage controller is further configured to encode the plurality of additional overhead bits to obtain encoded additional overhead bits, and to distribute the encoded additional overhead bits among the first data chunks to obtain the appended first data chunks.

15. The storage controller of claim 14, wherein the plurality of additional overhead bits are encoded using a first code, and the appended first data chunks and the second data chunks are encoded using a second code different from the first code.

16. A method of controlling a storage device, the method being executed by at least one processor and comprising:

allocating a plurality of code rates to a plurality of pages included in a non-volatile memory;

clustering the plurality of pages into a first plurality of pages and a second plurality of pages based on the plurality of code rates;

determining a plurality of page associations such that each second page from the second plurality of pages is associated with at least one first page from the first plurality of pages;

encoding data based on the plurality of code rates to generate encoded data, wherein the encoding comprises obtaining side information corresponding to the second plurality of pages and transferring the side information to the first plurality of pages, and storing the encoded data in the plurality of pages.

17. The method of claim 16, wherein the plurality of code rates are determined based on page characteristic information of each page of the plurality of pages.

18. The method of claim 16, wherein the side information is transferred such that differences between frame error rates of the plurality of pages are reduced.

19. The method of claim 16, wherein the allocating the plurality of code rates comprises:

calculating a plurality of frame error rates corresponding to the plurality of pages;

sorting the plurality of pages in an order of the plurality of frame error rates; and based on a highest frame error rate from among the plurality of frame error rates being greater than a lowest frame error rate from among the plurality of frame error rates, iteratively subtracting an overhead allocation from a page corresponding to the lowest frame error rate and adding the overhead allocation to a page corresponding to the highest frame error rate, until the highest frame error rate is less than or equal to the lowest frame error rate.

20. The method of claim 19, wherein the first plurality of pages correspond to a plurality of first code rates, and the second plurality of pages correspond to a plurality of second code rates, and wherein the plurality of first code rates are higher than a predetermined threshold rate, and the plurality of second code rates are lower than the predetermined threshold rate.

\* \* \* \* \*